US009706368B2

(12) United States Patent
Zuniga et al.

(10) Patent No.: US 9,706,368 B2
(45) Date of Patent: Jul. 11, 2017

(54) MANAGING MULTICAST TRAFFIC

(75) Inventors: Juan Carlos Zuniga, Quebec (CA); Carlos Jesus Bernardos, Fuenlabrada (ES)

(73) Assignee: InterDigital Patent Holdings, Inc., Wilmington, DE (US)

( * ) Notice: Subject to any disclaimer, the term of this patent is extended or adjusted under 35 U.S.C. 154(b) by 263 days.

(21) Appl. No.: 14/234,143

(22) PCT Filed: Jul. 20, 2012

(86) PCT No.: PCT/US2012/047603
§ 371 (c)(1),
(2), (4) Date: May 5, 2014

(87) PCT Pub. No.: WO2013/016189
PCT Pub. Date: Jan. 31, 2013

(65) Prior Publication Data
US 2015/0181394 A1    Jun. 25, 2015

Related U.S. Application Data

(60) Provisional application No. 61/510,868, filed on Jul. 22, 2011.

(51) Int. Cl.
*H04W 4/06* (2009.01)
*H04W 72/00* (2009.01)
(Continued)

(52) U.S. Cl.
CPC ........... *H04W 4/06* (2013.01); *H04W 72/005* (2013.01); *H04W 76/002* (2013.01);
(Continued)

(58) Field of Classification Search
CPC ..... H04W 4/06; H04W 88/16; H04W 88/182; H04W 76/002
See application file for complete search history.

(56) References Cited

U.S. PATENT DOCUMENTS 9,210,735 B2* 12/2015 Sarikaya ............... H04L 61/251
2003/0039232 A1* 2/2003 Casati .................. H04L 12/185
370/337
(Continued)

FOREIGN PATENT DOCUMENTS

JP      2010-537526 A    12/2010
WO  WO 2011/009493 A1    1/2011
(Continued)

OTHER PUBLICATIONS

Asaeda et al., "PMIPv6 Extensions for Multicast", MULTIMOB Group, Internet-Draft, Intended Status: Standards Track, Expires: Jan. 14, 2010, Jul. 13, 2009, pp. 1-33.
(Continued)

*Primary Examiner* — Jenee Williams
(74) *Attorney, Agent, or Firm* — Condo Roccia Koptiw LLP

(57) ABSTRACT

Multicast traffic in a communication network may be obtained via subscription. For example, the multicast traffic may be obtained via a local subscription, via a visited domain of a mobile node for example, or a remote subscription, via a home domain of a mobile node for example, A network entity, such as a Mobile Access Gateway (MAG) and/or a local multicast router for example, may be used to manage the routing of the multicast traffic to the mobile node. The network entity may manage the multicast traffic using one or more multicast policies that may indicate how to route the multicast traffic to a mobile node.

19 Claims, 18 Drawing Sheets

(51) Int. Cl.
*H04W 76/00* (2009.01)
*H04W 88/16* (2009.01)
*H04W 88/18* (2009.01)
*H04W 80/04* (2009.01)

(52) U.S. Cl.
CPC ......... *H04W 88/16* (2013.01); *H04W 88/182* (2013.01); *H04W 80/045* (2013.01)

(56) References Cited

U.S. PATENT DOCUMENTS

| | | | | |
|---|---|---|---|---|
| 2003/0063608 A1* | 4/2003 | Moonen | H04L 12/1836 | 370/390 |
| 2003/0104807 A1* | 6/2003 | Momona | H04L 12/18 | 455/422.1 |
| 2004/0125803 A1* | 7/2004 | Sangroniz | H04L 12/1886 | 370/390 |
| 2005/0152370 A1* | 7/2005 | Meehan | H04L 12/185 | 370/393 |
| 2005/0232293 A1* | 10/2005 | Pelt | H04L 12/185 | 370/432 |
| 2007/0280232 A1* | 12/2007 | Dec | H04L 12/18 | 370/390 |
| 2009/0040964 A1* | 2/2009 | Zhao | H04L 29/12311 | 370/328 |
| 2009/0059935 A1* | 3/2009 | Dec | H04L 12/185 | 370/401 |
| 2009/0066438 A1 | 3/2009 | Kim et al. | | |
| 2009/0144807 A1* | 6/2009 | Zheng | H04L 63/08 | 726/3 |
| 2009/0274163 A1* | 11/2009 | Huang | H04L 12/5695 | 370/432 |
| 2009/0310564 A1* | 12/2009 | Kim | H04W 36/12 | 370/331 |
| 2009/0313118 A1* | 12/2009 | Akiyoshi | G06Q 30/0251 | 705/14.49 |
| 2010/0172294 A1* | 7/2010 | Toyokawa | H04W 8/087 | 370/328 |
| 2010/0177674 A1* | 7/2010 | Aggarwal | H04L 45/02 | 370/312 |
| 2010/0177689 A1* | 7/2010 | Toyokawa | H04W 36/0033 | 370/328 |
| 2010/0177752 A1* | 7/2010 | Aggarwal | H04L 45/50 | 370/338 |
| 2010/0189037 A1* | 7/2010 | Lee | H04W 8/085 | 370/328 |
| 2010/0202357 A1* | 8/2010 | Kim | H04L 63/0892 | 370/328 |
| 2010/0208663 A1* | 8/2010 | Hirano | H04L 45/308 | 370/328 |
| 2010/0208691 A1* | 8/2010 | Toyokawa | H04L 45/306 | 370/331 |
| 2010/0214998 A1* | 8/2010 | Hirano | H04L 45/02 | 370/329 |
| 2010/0265869 A1* | 10/2010 | Sarikaya | H04L 12/1836 | 370/312 |
| 2010/0303031 A1* | 12/2010 | Rune | H04L 63/0227 | 370/329 |
| 2010/0309846 A1* | 12/2010 | Rune | H04L 12/5691 | 370/328 |
| 2010/0315973 A1* | 12/2010 | Hirano | H04W 8/087 | 370/254 |
| 2010/0315992 A1* | 12/2010 | Turanyi | H04W 8/082 | 370/315 |
| 2011/0110286 A1* | 5/2011 | Lu | H04L 12/185 | 370/312 |
| 2011/0134883 A1* | 6/2011 | Kang | H04W 36/14 | 370/331 |
| 2011/0286384 A1 | 11/2011 | Sugimoto et al. | | |
| 2012/0005372 A1* | 1/2012 | Sarikaya | H04L 61/251 | 709/245 |
| 2013/0016645 A1 | 1/2013 | Moriwaki et al. | | |

FOREIGN PATENT DOCUMENTS

WO  WO 2011/035168 A1  3/2011
WO  WO 2011/083704 A1  7/2011

OTHER PUBLICATIONS

Johnson et al., "Mobility Support in IPv6", Network Working Group, Request for Comments: 3775, Category: Standards Track, Jun. 2004, pp. 1-165.
Takahashi et al., "Multicast Receiver Mobility over Mobile IP Networks Based on Forwarding Router Discovery", IEICE Technical Report, MoMuc, Mobile Multimedia Communication, MoMuC2005-70, The Institute of Electronics, Information and Communication Engineers, Nov. 2005, 9 pages.
Zuniga et al, "Multicast Tree Mobility Anchor (MTMA)", IETF MULTIMOB WG, 81st IETF, Quebec, Jul. 2011, pp. 1-8.
Zuniga et al, "Support Multicast Services Using Proxy Mobile IPv6", MULTIMOB Group, Internet Draft, Intended Status: Standards Track, Expires: Jan. 2012, Jul. 11, 2011, pp. 1-22.
Schmidt et al. "Base Deployment for Multicast Listener Support in Proxy Mobile IPv6 (PMIPv6) Domains", The Internet Engineering Task Force (IETF), RFC #6224, Apr. 2011, 19 pages.
Zuniga et al., "Support Multicast Services Using Proxy Mobile IPv6", draft-zuniga-multimob-smspmip-03, MULTIMOB Group, Internet-Draft, Expires: Nov. 30, 2010, May 31, 2010, 13 pages.
Jeon et al., "PMIPv6 Multicasting Support using Native Infrastructure" draft-sijeon-multimob-direct-routing-pmip6, Network Working Group, Internet-Draft, Expires: Jan. 11, 2012, Jul. 11, 2011, 13 pages.
Tsirtsis et al., "Traffic Selectors for Flow Bindings", The Internet Engineering Task Force (IETF), RFC #6088, Jan. 2011, 13 pages.
Zuniga et al., "Multicast Mobility Routing Optimizations for Proxy Mobile IPv6", MULTIMOB Working Group, Oct. 22, 2012, 30 pages.
Zuniga et al., "Support Multicast Services Using Proxy Mobile IPv6", MULTIMOB Group, Jul. 11, 2011, 22 pages.

\* cited by examiner

MANAGING MULTICAST TRAFFIC

CROSS-REFERENCE TO RELATED APPLICATIONS

This application is the 35 U.S.C. §371 National Stage of Patent Cooperation Treaty Application No. PCT/US2012/047603, filed Jul. 20, 2012, which claims the benefit of U.S. provisional application No. 61/510,868, filed on Jul. 22, 2011, which is incorporated by reference herein in its entirety.

BACKGROUND

Network messages and/or information may be transmitted to devices, or groups of devices, communicating via the network using unicast and/or multicast transmissions. Multicast transmissions may be implemented using a one-to-many distribution, where a single source may transmit information to multiple network entities. Thus, some multicast mobility procedures may cause tunnel convergence, in which multiple tunnels may be established between various entities.

The use of multicast networks for data transmission, however, is not optimal. For example, a wireless transmit receive unit (WTRU) or a mobile node (MN) that receives content and/or services via such multicast networks may lose access to a multicast service (e.g., when the WTRU moves beyond a coverage area). While the WTRU may re-subscribe and/or may receive the service over another communication network, session continuity may be lost for that data session.

Additionally, when multicast services are available to a WTRU or a MN, the multicast services may not be efficiently provided.

SUMMARY

System, method, and apparatus embodiments are described herein for managing multicast traffic. For example, the multicast traffic may be managed using a Mobile Access Gateway (MAG). The MAG may receive an indication of at least one multicast group that is associated with the mobile node. The indication may be received from a mobile node for example. The MAG may determine, based on at least one multicast policy, a multicast subscription associated with the multicast group for routing the multicast traffic to the mobile node.

According to an example embodiment, the multicast subscription may be determined by selecting between a local subscription and a remote subscription. The local subscription may include a subscription via a visited domain associated with the mobile node, while the remote subscription may include a subscription via a home domain associated with the mobile node.

According to an example embodiment, the multicast subscription may be statically pre-configured or determined dynamically based on the at least one multicast policy. The multicast subscription may also be determined based on an indication of a preferred subscription received from a user or mobile node.

The embodiments described in the Summary are provided as examples, and are in no way limiting on the scope of the embodiments described elsewhere herein.

BRIEF DESCRIPTION OF THE DRAWINGS

A more detailed understanding may be had from the Detailed Description below, given by way of example in conjunction with drawings appended hereto. The FIGs. in such drawings, like the detailed description, are examples. As such, the FIGs. and the detailed description are not to be limiting.

DETAILED DESCRIPTION

When referred to hereafter, the terminology mobile node (MN) may include, for example, a wireless transmit/receive unit (WTRU). The WTRU may include, but is not limited to, user equipment (UE), a mobile station, a fixed or mobile subscriber unit, a pager, a cellular telephone, a personal digital assistant (PDA), a computer, or any other type of device capable of operating in a wireless environment. When referred to hereafter, the terminology base station may include, but is not limited to, a Node-B, a site controller, an access point (AP), an evolved Node-B (eNB), a router, a gateway, or any other type of interfacing device capable of operating in a wireless environment.

System, method, and apparatus embodiments are described herein for managing multicast traffic offload. Multicast transmissions may be used to transmit data (e.g., video data) to a destination device, or group of destination devices. For example, using multicast transmissions, the data may be transmitted simultaneously in a single transmission from one or more sources. Copies of the data may be created in other network elements (e.g., routers, servers, etc.) after its initial transmission for continuing transmission of the data to a MN or end user An example of a multicast network may include an Internet Protocol (IP) multicast network. An IP multicast network may implement IP applications (e.g., applications for streaming media and/or Internet television). In IP multicast, multicast may be implemented at the IP routing level. For example, routers and/or other network entities may create distribution paths (e.g., efficient distribution paths) for data sent to a multicast destination address Another example of a multicast network may include a downlink multicast network, such as digital video broadcasting (DVB), media forward link only (MediaFLO), and/or the like. A multicast network may have network coverage that is regional. An MN, or a WTRU for example, that use such multicast networks may lose access to a multicast service when the MN moves beyond a coverage area.

In bi-directional mobile communication networks (e.g., third generation partnership program (3GPP), multimedia broadcast multicast services (MBMS), and/or the like), mobility may be implemented in accordance with respective standards. In hybrid networks, such as overlaid downlink only and bi-directional networks for example, mobility may be supported at the application level, such as with the open mobile alliance digital mobile broadcast enabler (OMA BCAST) for example. These types of hybrid networks may utilize a break-before-make service, which may result in service interruptions.

Figure 1:
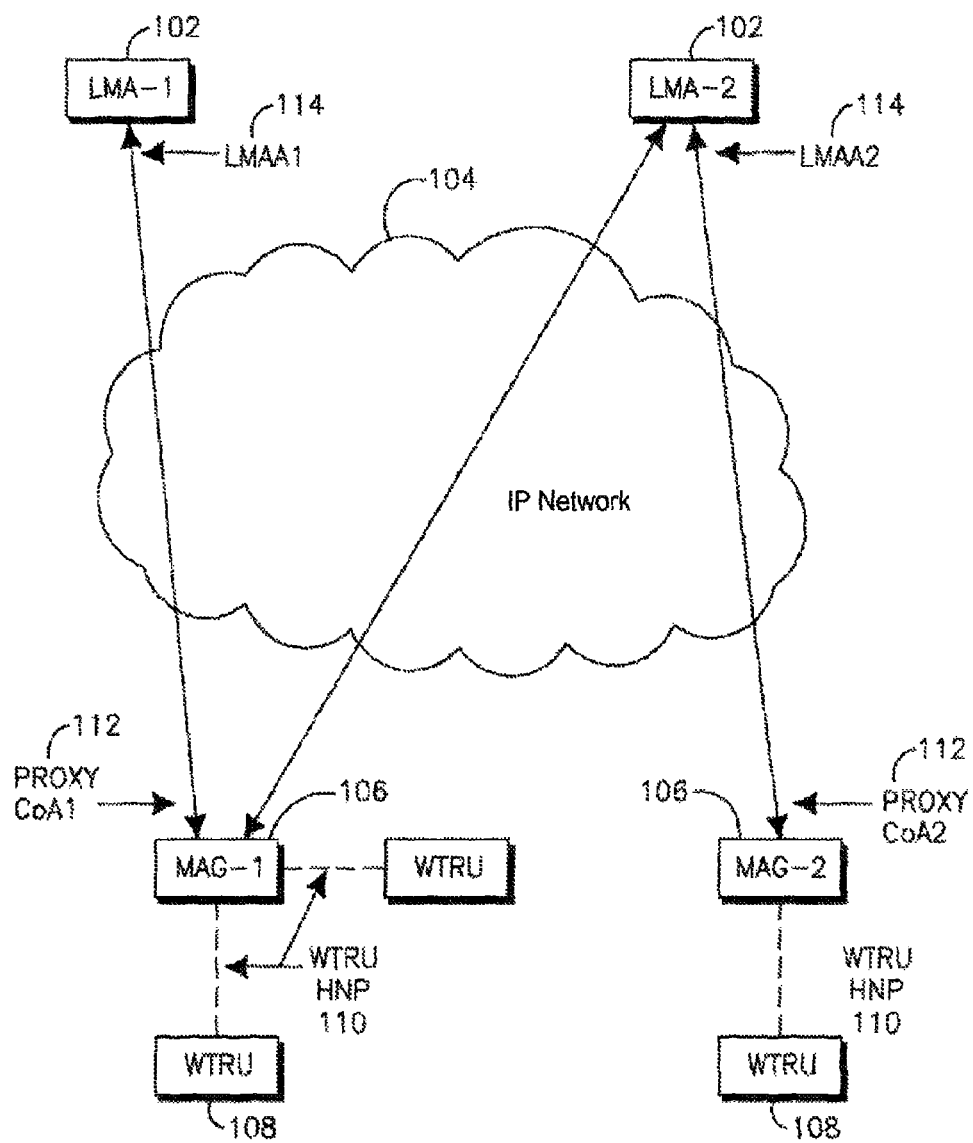
FIG. 1 illustrates the architecture of a proxy mobile internet protocol (IP) v6 (PMIPv6) domain.

FIG. 1 illustrates the architecture of a proxy mobile IP (PMIP) domain (e.g., PMIPv4, PMIPv6, or any other version). The PMIP may be introduced for network-based mobility management. The functional entities in the network-based localized mobility management (NETLMM) infrastructure may include a local mobility anchor (LMA) 102 and/or a mobile access gateway (MAG) 106. There may be multiple local mobility anchors (LMAs) 102 in a PMIP domain each serving a different group of WTRUs 108. The LMA 102 may be responsible for maintaining the reachability state of the WTRU 108 and may be the topological anchor point for the WTRU's 108 home network prefixes (HNP). The MAG 106 may be the entity that performs the mobility management on behalf of the WTRU 108. It may reside on the access link where the WTRU 108 may be anchored. The MAG 106 may be responsible for detecting the movement of the WTRU 108 to and from the access link and for initiating binding registration to the WTRUs 108. The WTRU 108 may be an IP-enabled node (e.g., IPv4-only node, an IPv6-only node, or a dual-stack node).

The WTRU's home network prefix (WTRU-HNP) 110 may be a prefix assigned to the link between the WTRU 108 and the MAG 106. More than one prefix may be assigned to the link between the WTRU 108 and the MAG 106. The proxy Care-of Address (Proxy-CoA) 112 may be the global address configured on the egress interface of the MAC 106 and may be the transport endpoint of the tunnel between the LMA 102 and the MAG 106. The LMA address (LMAA) 114 may be the global address that is configured on the interface of the LMA 102 and may be the transport endpoint of the bi-directional tunnel established between the LMA 102 and the MAG 106. The IP network 104 may refer to the network where the mobility management of a WTRU 108 may be handled using IP protocols (e.g., PMIPv4, PMIPv6, or any other version). The IP network 104 may include the LMAs 102 and/or the MAGs 106 between which security associations may be setup and authorization for sending proxy binding updates on behalf of the WTRUs 108 may be ensured.

Layer 3 (L3) mobility protocols (e.g., PMIP, session initiation protocol (SIP), and the like) may be used for unicast traffic. These L3 mobility protocols may lack support for multicast services. Multicast protocols such as interact group management protocol (IGMP) or multicast listener discovery (MLD) may be enhanced to reduce the latency inherent in resuming multicast services after handover.

Systems, methods, and apparatuses are described herein to enable mobility for multicast services, such as multicast multimedia (e.g., mobile TV, radio, presence, micro-blogging, file sharing, podcast, social networking, and/or the like). The embodiments described herein may be implemented in L3 mobility for PMIP and may be applied to different access technologies regardless of link layer or physical layer. Unicast and/or multicast may be used for transmissions. Using multicast at lower layers, together with the L3 multicast mobility support for example, may enhance the overall system efficiency. Certain representative embodiments described herein may enable multicast transmissions at lower layers. For example, Multimedia Broadcast Multicast Service (MBMS) may be used in long term evolution (LTE) and/or physical multicast channel (PMCH), multicast control channel (MCCH), and multicast traffic channel (MTCH) may be used to carry the multicast data.

Figure 2A:
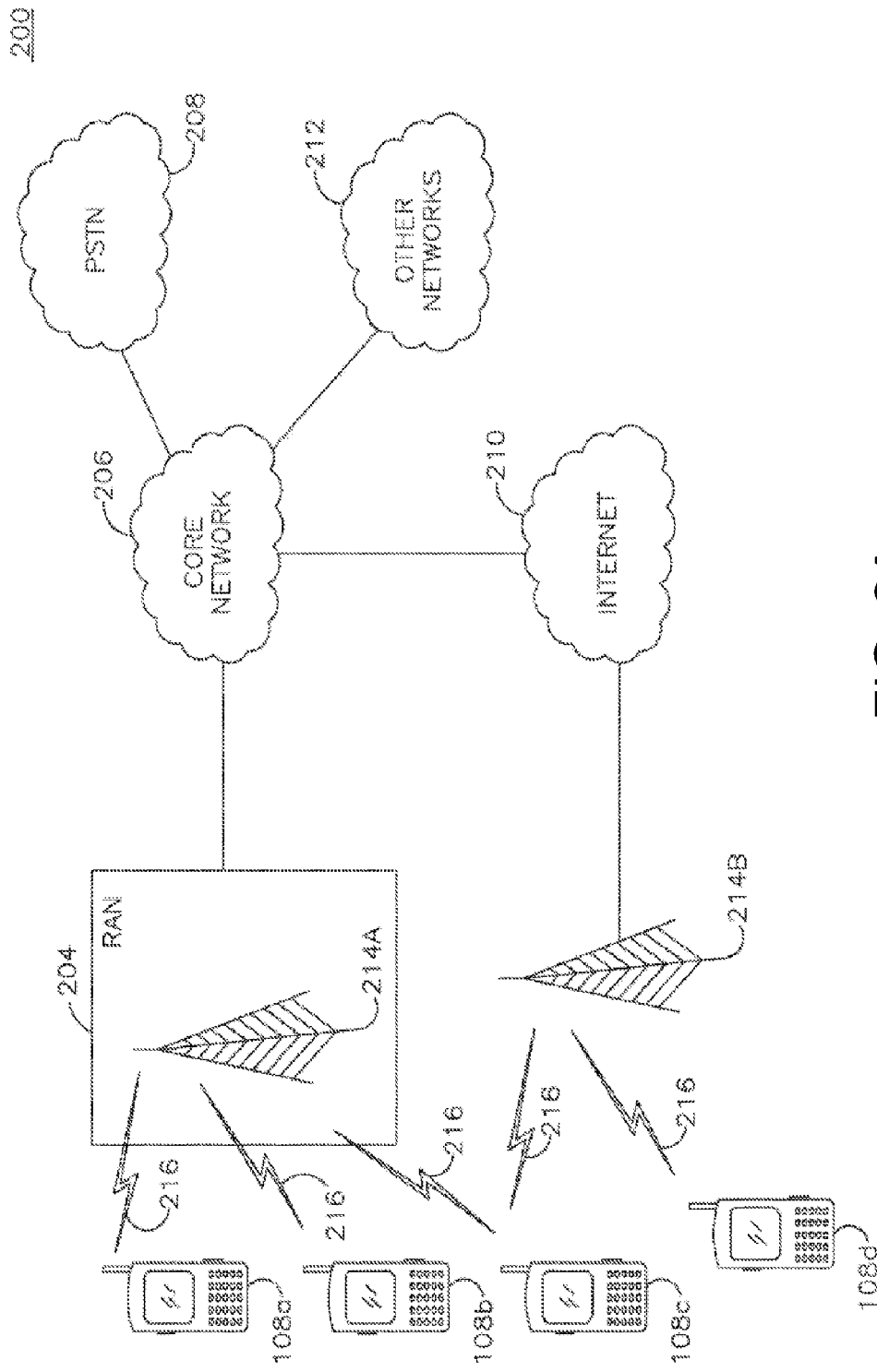
FIG. 2A is a system diagram of an example communications system in which one or more disclosed embodiments may be implemented.

FIG. 2A is a diagram of an example communications system 200 in which one or more disclosed embodiments may be implemented. The communications system 200 may be a multiple access system that may provide content, such as voice, data, video, messaging, broadcast, etc., to multiple wireless users. The communications system 200 may enable multiple wireless users to access such content through the sharing of system resources, including wireless bandwidth. For example, the communications systems 200 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 2A, the communications system 200 may include wireless transmit/receive units (WTRUs) 108a, 108b, 108c, 108d, a radio access network (RAN) 204, a core network 206, a public switched telephone network (PSTN) 208, the Internet 210, and other networks 212, though the described embodiments contemplate any number of WTRUs, base stations, networks, and/or network elements. Each of the WTRUs 108a, 108b, 108c, and 108d may be any type of device configured to operate and/or communicate in a wireless environment. By way of example, the WTRUs 108a, 108b, 108c, 108d may be configured to transmit and/or receive wireless signals and may include UE, a mobile station, a mobile node, a fixed or mobile subscriber unit, a pager, a cellular telephone, a personal digital assistant (PDA), a smartphone, a laptop, a netbook, a personal computer, a tablet, a wireless sensor, consumer electronics, and/or the like.

The communications systems 200 may also include a base station 214a and a base station 214b. Each of the base stations 214a, 214b may be any type of device configured to wirelessly interface with at least one of the WTRUs 108a, 108b, 108c, 108d to facilitate access to one or more communication networks, such as the core network 206, the Internet 210, and/or the networks 212. By way of example, the base stations 214a, 214b may be a base transceiver station (BTS), a Node-B, an eNode B, a Home Node B, a Home eNode B, a site controller, an access point (AP), a wireless router, and/or the like. While the base stations 214a, 214b are each depicted as a single element, it is contemplated that the base stations 214a, 214b may include any number of interconnected base stations and/or network elements.

The base station 214a may be part of a RAN 204, which may also include other base stations and/or network elements (not shown), such as a base station controller (BSC), a radio network controller (RNC), relay nodes, etc. The base station 214a and/or the base station 214b may be configured to transmit and/or receive wireless signals within a particular geographic region, which may be referred to as a cell (not shown). The cell may further be divided into cell sectors. For example, the cell associated with the base station 214a may be divided into three sectors. Thus, in certain representative embodiments, the base station 214a may include three transceivers, e.g., one for each sector of the cell. In certain representative embodiments, the base station 214a may employ multiple input multiple output (MIMO) technology and, therefore, may utilize multiple transceivers for each sector of the cell.

The base stations 214a, 214b may communicate with one or more of the WTRUs 108a, 108b, 108c, 108d over an air interface 216, which may be any suitable wireless communication link (e.g., radio frequency (RF), microwave, infrared (IR), ultraviolet (UV), visible light, etc.). The air interface 216 may be established using any suitable radio access technology (RAT).

As noted above, the communications system 200 may be a multiple access system and may employ one or more channel access schemes, such as CDMA, TDMA, FDMA, OFDMA, and/or SC-FDMA, among others. For example, the base station 214a in the RAN 204 and the WTRUs 108a, 108b, 108c may implement a radio technology such as Universal Mobile Telecommunications System (UMTS) Terrestrial Radio Access (UTRA), which may establish the air interface 216 using wideband CDMA (WCDMA). WCDMA may include communication protocols such as High-Speed Packet Access (HSPA) and/or Evolved HSPA (HSPA+), HSPA may include High-Speed Downlink Packet Access (HSDPA) and/or High-Speed Uplink Packet Access (HSURA).

In certain representative embodiments, the base station 214a and the WTRUs 108a, 108b, 108c may implement a radio technology such as Evolved UMTS Terrestrial Radio Access (E-UTRA), which may establish the air interface 216 using Long Term Evolution (LTE) and/or LTE-Advanced (LTE-A).

In certain representative embodiments, the base station 214a and/or the WTRUs 108a, 108b, 108c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard S56 (IS-S56), Global System for Mobile communications (GSM), and/or Enhanced Data rates for GSM Evolution (EDGE), GSM EDGE (GERAN), and/or the like.

The base station 214b in FIG. 2A may be a wireless router, Home Node B, Home eNode B, and/or an access point, for example, and may utilize any suitable RAT for facilitating wireless connectivity in a localized area, such as a place of business, a home, a vehicle, a campus, and/or the like. In certain representative embodiments, the base station 214b and the WTRUs 108c, 108d may implement a radio technology such as IEEE 802.11 to establish a wireless local area network (WLAN). In other embodiments, the base station 214b and/or the WTRUs 108c, 108d may implement a radio technology such as IEEE 802.15 to establish a wireless personal area network (WPAN). In yet other embodiments, the base station 214b and/or the WTRUs 108c, 108d may utilize a cellular-based RAT (e.g., WCDMA, CDMA2000, GSM, LTE, LTE-A, etc.) to establish a picocell or feratocell. As shown in FIG. 2A, the base station 214b may have a direct connection to the Internet 210. The base station 214b may not be used to access the Internet 210 via the core network 206.

The RAN 204 may be in communication with the core network 206, which may be any type of network configured to provide voice, data, applications, and/or voice over internet protocol (VoIP) services to one or more of the WTRUs 108a, 108b, 108c, 108d. For example, the core network 206 may provide call control, billing services, mobile location-based services, pre-paid calling, Internet connectivity, and/or video distribution, etc., and/or perform high-level security functions, such as user authentication for example.

Although not shown in FIG. 2A, it is contemplated that the RAN 204 and/or the core network 206 may be in direct or indirect communication with other RANs that employ the same RAT as the RAN 204 or a different RAT. For example, in addition to being connected to the RAN 204, which may utilize an E-UTRA radio technology, the core network 206 may also be in communication with another RAN (not shown) employing a GSM radio technology.

The core network 206 may also serve as a gateway for the WTRUs 108a, 108b, 108c, 108d to access the PSTN 208, the Internet 210, and/or other networks 212. The PSTN 208 may include circuit-switched telephone networks that may provide plain old telephone service (POTS). The Internet 210 may include a global system of interconnected computer networks and devices that use common communication protocols, such as the transmission control protocol (TCP), user datagram protocol (UDP) and the internet protocol (IP) in the TCP/IP internet protocol suite. The networks 212 may include wired or wireless communications networks owned and/or operated by other service providers. For example, the networks 212 may include another core network connected to one or more RANs, which may employ the same RAT as the RAN 204 or a different RAT.

Some or all of the WTRUs 108a, 108b, 108c, and 108d in the communications system 200 may include multi-mode capabilities, e.g., the WTRUs 108a, 108b, 108c and 108d may include multiple transceivers for communicating with different wireless networks over different wireless links. For example, the WTRU 108c shown in FIG. 2A may be configured to communicate with the base station 214a, which may employ a cellular-based radio technology, and with the base station 214b, which may employ an IEEE 802 radio technology.

Figure 2B:
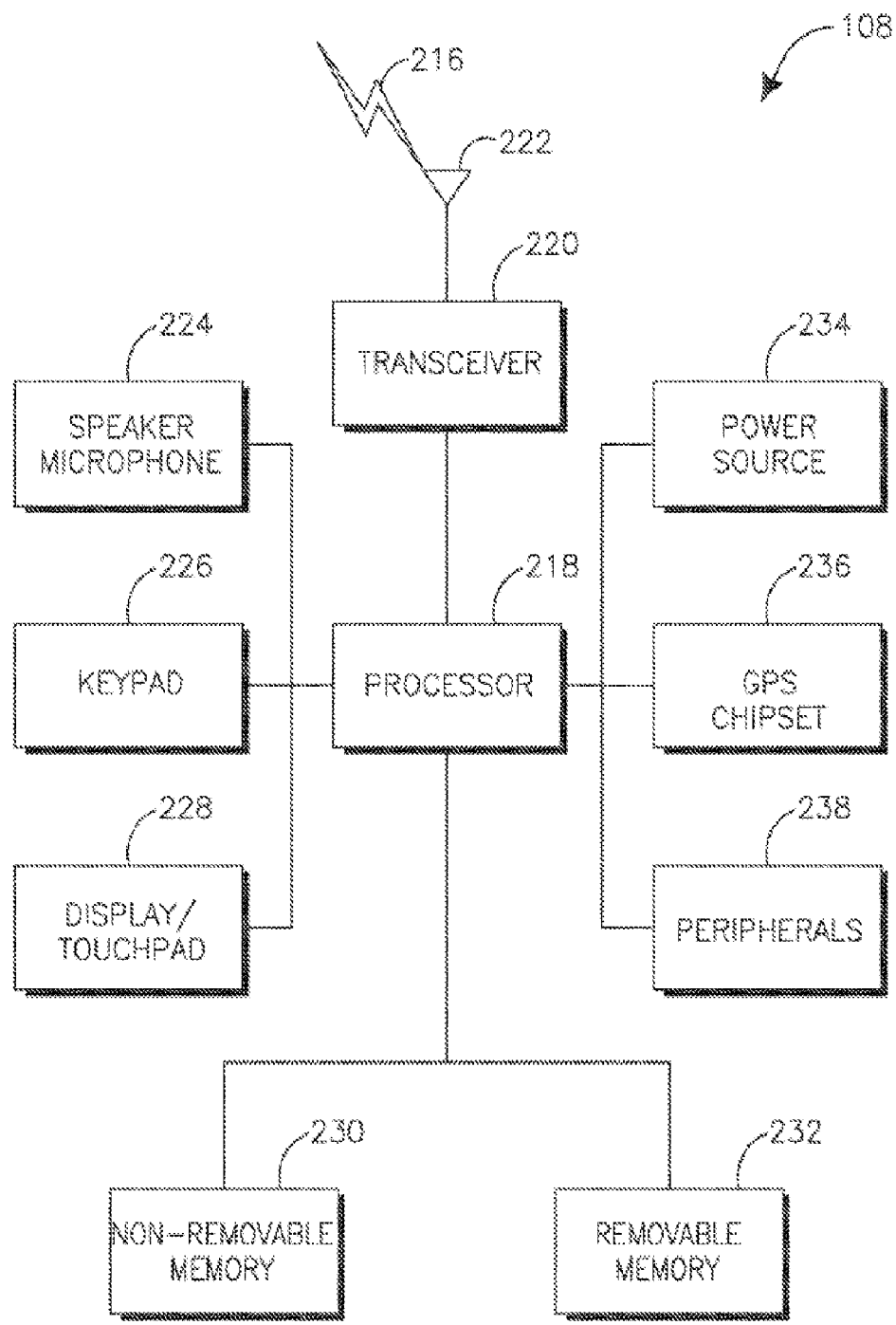
FIG. 2B is a system diagram of an example wireless transmit/receive unit (WTRU) that may be used within the communications system illustrated in FIG. 2A.

FIG. 2B is a system diagram of an example WTRU 108. As shown in FIG. 2B, the WTRU 108 may include a processor 218, a transceiver 220, a transmit/receive element 222, a speaker/microphone 224, a keypad 226, a display/touchpad 228, non-removable memory 230, removable memory 232, a power source 234, a global positioning system (GPS) chipset 236, and/or other peripherals 238. It is contemplated that the WTRU 108 may include any sub-combination of the foregoing elements while remaining consistent with an embodiment.

The processor 218 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), and/or a state machine, and the like. The processor 218 may perform signal coding, data processing, power control, input/output processing, and/or any other functionality that enables the WTRU 108 to operate in a wireless environment. The processor 218 may be coupled to the transceiver 220, which may be coupled to the transmit/receive element 222. While FIG. 2B depicts the processor 218 and the transceiver 220 as separate components, the processor 218 and the transceiver 220 may be integrated together in an electronic package or chip.

The transmit/receive element 222 may be configured to transmit signals to, and/or receive signals from, a base station (e.g., the base station 214a) over the air interface 216. For example, in certain embodiments, the transmit/receive element 222 may be an antenna configured to transmit and/or receive RF signals. In other embodiments, the transmit/receive element 222 may be an emitter/detector configured to transmit and/or receive IR, UV, and/or visible light signals, for example. In yet other embodiments, the transmit/receive element 222 may be configured to transmit and/or receive both RF and light signals. It is contemplated that the transmit/receive element 222 may be configured to transmit and/or receive any combination of wireless signals.

Although the transmit/receive element 222 is depicted in FIG. 2B, as a single element, the WTRU 108 may include any number of transmit/receive elements 222. The WTRU 108 may employ MIMO technology. Thus, in certain embodiments, the WTRU 108 may include two or more transmit/receive elements 222 (e.g., multiple antennas) for transmitting and receiving wireless signals over the air interface 216.

The transceiver 220 may be configured to modulate the signals that are to be transmitted by the transmit/receive element 222 and to demodulate the signals that are received by the transmit/receive element 222. As noted above, the WTRU 108 may have multi-mode capabilities and the transceiver 220 may include multiple transceivers for enabling the WTRU 108 to communicate via multiple RATs, such as UTRA and IEEE 802.11, for example.

The processor 218 of the WTRU 108 may be coupled to, and may receive user input data from, the speaker/microphone 224, the keypad 226, and/or the display/touchpad 228 (e.g., a liquid crystal display (LCD) display unit or organic light emitting diode (OLED) display unit). The processor 218 may also output user data to the speaker/microphone 224, the keypad 226, and/or the display/touch pad 228. The processor 218 may access information from, and store data in, any type of suitable memory, such as the non-removable memory 230 and/or the removable memory 232. The non-removable memory 230 may include random-access memory (RAM), read-only memory (ROM), a hard disk, or any other type of memory storage device including no-transitory memory. The removable memory 232 may include a subscriber identity module (SIM) card, a memory stick, a secure digital (SD) memory card, and/or the like. In other embodiments, the processor 218 may access information from, and store data in, memory that is not physically located on the WTRU 108, such as on a server or a home computer (not shown).

The processor 218 may receive power from power source 234, and may be configured to distribute and/or control the power to the other components in the WTRU 108. The power source 234 may be any suitable device for powering the WTRU 108. For example, the power source 234 may include one or more dry cell batteries (e.g., nickel-cadmium (NiCd), nickel-zinc (NiZn), nickel metal hydride (NiMH), lithium ion (Li-ion), etc.), solar cells, fuel cells, and/or the like.

The processor 218 may also be coupled to the GPS chipset 236, which may be configured to provide location information (e.g., longitude and latitude) regarding the current location of the WTRU 108. In addition to, or in lieu of, the information from the GPS chipset 236, the WTRU 108 may receive location information over the air interface 216 from a base station (e.g., base stations 214a, 214b) and/or determine its location based on the timing of the signals being received from two or more nearby base stations. It is contemplated that the WTRU 108 may acquire location information by way of any suitable location-determination method while remaining consistent with an embodiment.

The processor 218 may further be coupled to other peripherals 238, which may include one or more software and/or hardware modules that provide additional features, functionality and/or wired or wireless connectivity. For example, the peripherals 238 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and/or the like.

Figure 2C:
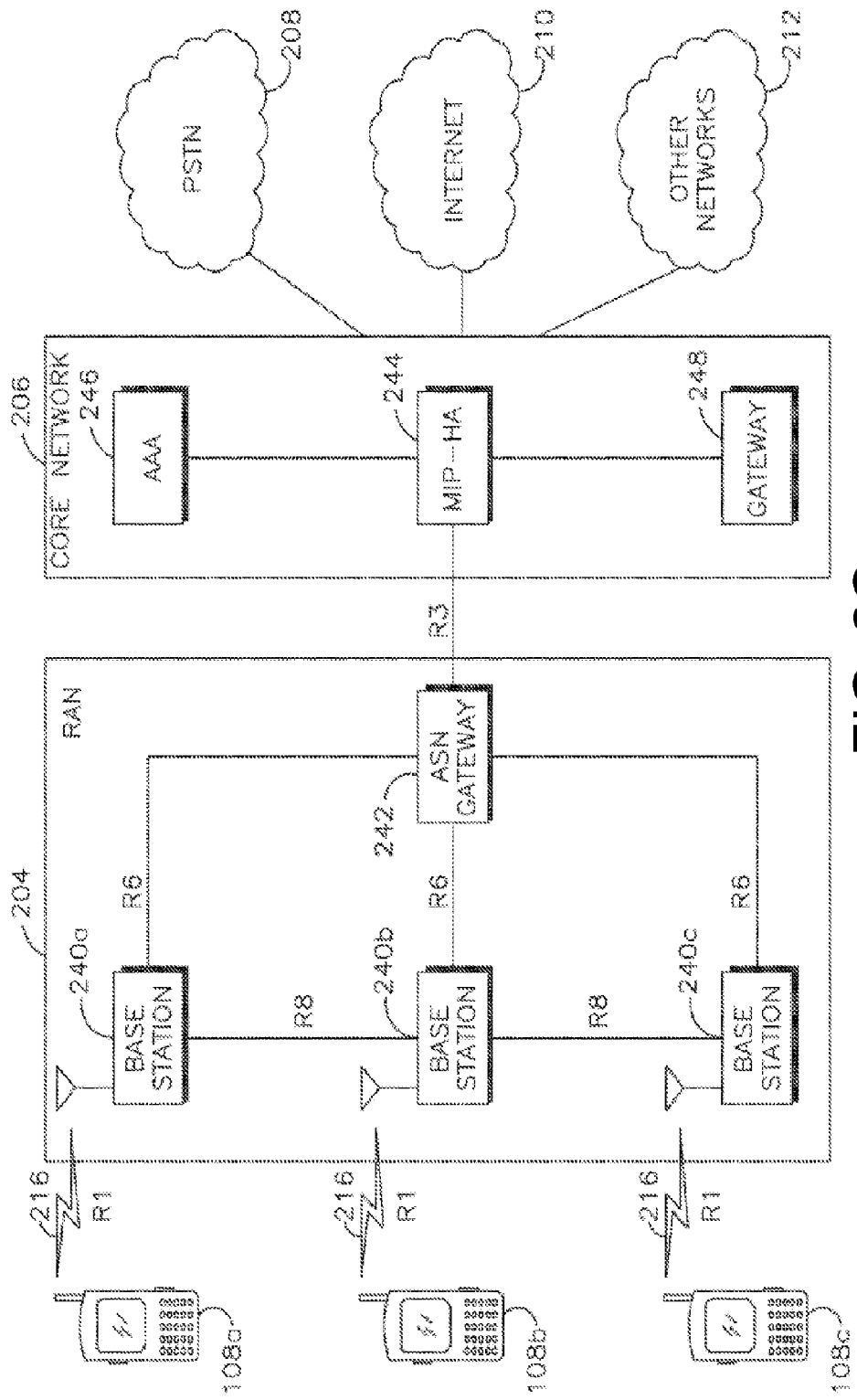
FIG. 2C is a system diagram of an example radio access network and an example core network that may be used within the communications system illustrated in FIG. 2A.

FIG. 2C is a system diagram of the RAN 204 and the core network 206. The RAN 204 may be an access service network (ASN) that may employ IEEE 802.16 radio technology to communicate with the WTRUs 108a, 108b, and 108c over the air interface 216. As further discussed below, the communication links between the different functional entities of the WTRUs 108a, 108b, 108c, the RAN 204, and the core network 206 may be defined as reference points.

As shown in FIG. 2C, the RAN 204 may include base stations 240a, 240b, 240c, and an ASN (or PDN) gateway 242, though it is contemplated that the RAN 204 may include any number of base stations and ASN (or PDN) gateways while remaining consistent with an embodiment. The base stations 240a, 240b, 240c may each be associated with a particular cell (not shown) in the RAN 204 and may each include one or more transceivers for communicating with the WTRUs 108a, 108b, 108c over the air interface 216. In one embodiment, the base stations 240a, 240b, 240c may implement MIMO technology. The base station 240a, for example, may use multiple antennas to transmit wireless signals to, and receive wireless signals from, the WTRU 108a. The base stations 240a, 240b, 240c may also provide mobility management functions, such as handoff triggering, tunnel establishment, radio resource management, traffic classification, quality of service (QoS) policy enforcement, and/or the like. The ASN gateway 242 (e.g., or PDN gateway for LTE) may serve as a traffic aggregation point and may be responsible for paging, caching of subscriber profiles, and/or routing to the core network 206, and/or the like.

The air interface 216 between the WTRUs 108a, 108b, 108c and the RAN 204 may be defined as an R1 reference point that may implement the IEEE 802.16 standards. Each of the WTRUs 108a, 108b, and 108c may establish a logical interface (not shown) with the core network 206. The logical interface between the WTRUs 108a, 108b, 108c and the core network 206 may be defined as an R2 reference point, which may be used for authentication, authorization, IP host configuration management, and/or mobility management.

The communication link between each of the base stations 240a, 240b, and 240c may be defined as an R8 reference point that includes protocols for facilitating WTRU handovers and the transfer of data between base stations. The communication link between the base stations 240a, 240b, 240c and the ASN gateway 242 may be defined as an R6 reference point. The R6 reference point may include protocols for facilitating mobility management based on mobility events associated with each of the WTRUs 108*a*, 108*b*, 108*c*.

As shown in FIG. 2C, the RAN 204 may be connected to the core network 206. The communication link between the RAN 204 and the core network 206 may defined as an R3 reference point that may include protocols for facilitating data transfer and mobility management capabilities, for example. The core network 206 may include a mobile IP home agent (MIP-HA) 244, an authentication, authorization, accounting (AAA) server 246, and/or a gateway 248. The MIP-HA 244 may be proxy MIPHA (PMIP-HA). While each of the foregoing elements are depicted as part of the core network 206, it is contemplated that anyone of these elements may be owned and/or operated by an entity other than the core network operator.

The MIP-HA 244 may be responsible for IP address management, and may enable the WTRUs 108*a*, 108*b*, and 108*c* to roam between different ASNs and/or different core networks. The MIP-HA 244 may provide the WTRUs 108*a*, 108*b*, 108*c* with access to packet-switched networks, such as the Internet 210, to facilitate communications between the WTRUs 108*a*, 108*b*, 108*c* and IP-enabled devices. The AAA server 246 may be responsible for user authentication and/or for supporting user services. The gateway 248 may facilitate interworking with other networks. For example, the gateway 248 may provide the WTRUs 108*a*, 108*b*, 108*c* with access to circuit-switched networks, such as the PSTN 208, to facilitate communications between the WTRUs 108*a*, 108*b*, 108*c* and traditional land-line communications devices. The gateway 248 may provide the WTRUs 108*a*, 108*b*, 108*c* with access to the networks 212, which may include other wired or wireless networks that may be owned and/or operated by other service providers.

Although not shown in FIG. 2C, it is contemplated that the RAN 204 may be connected to other ASNs and the core network 206 may be connected to other core networks. The communication link between the RAN 204 the other ASNs may be defined as an R4 reference point, which may include protocols for coordinating the mobility of the WTRUs 108*a*, 108*b*, 108*c* between the RAN 204 and the other ASNs. The communication link between the core network 206 and the other core networks may be defined as an R5 reference, which may include protocols for facilitating interworking between home core networks and visited core networks.

Figure 2D:
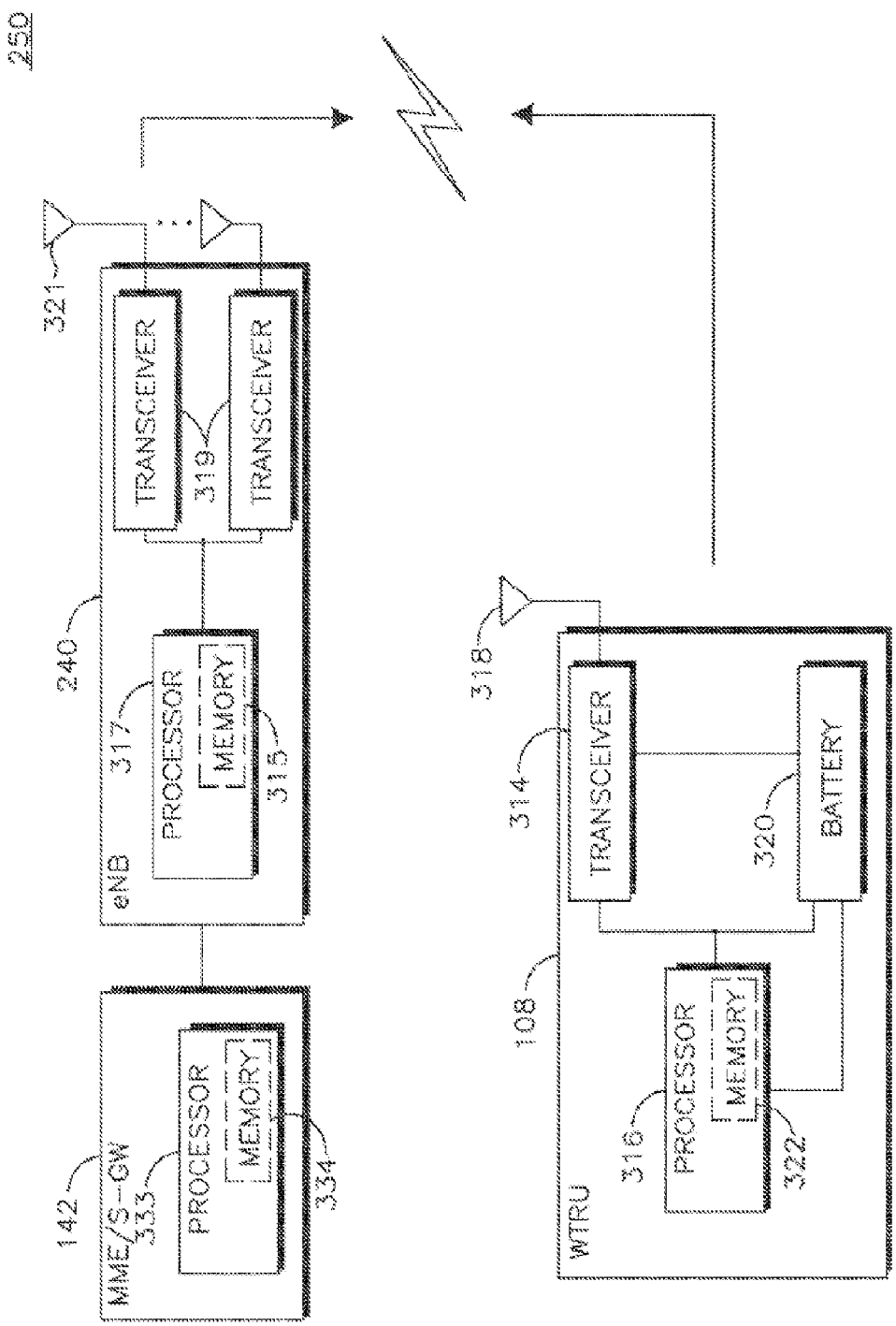
FIG. 2D is an example block diagram comprising components of a multicast mobility network.

FIG. 2D is an exemplary block diagram 250 comprising the WTRU 108, the eNB 240, and the Mobility Management Entity (MME)/Serving Gateway (S-GW) 142. As shown in FIG. 2D, the WTRU 108, the eNB 240, and the MME/S-GW 142 may be configured to perform multicast mobility.

The WTRU 108 may include a processor 316 with an optional linked memory 322, at least one transceiver 314, an optional battery 320, and/or an antenna 318. The processor 316 may be configured to perform implementations of multicast mobility.

The transceiver 314 is in communication with the processor 316 and the antenna 318 to facilitate the transmission and/or reception of wireless communications. In case a battery 320 may be used in the WTRU 108, it may power the transceiver 314 and/or the processor 316.

The eNB 240 may include a processor 317 with a linked memory 315, transceivers 319, and antennas 321. The processor 317 may be configured to perform implementations of multicast mobility.

The transceivers 319 may be in communication with the processor 317 and antennas 321 to facilitate the transmission and/or reception of wireless communications. The eNB 240 may be connected to the MME/S-GW 142 that may include a processor 333 with a linked memory 334.

Figure 3:
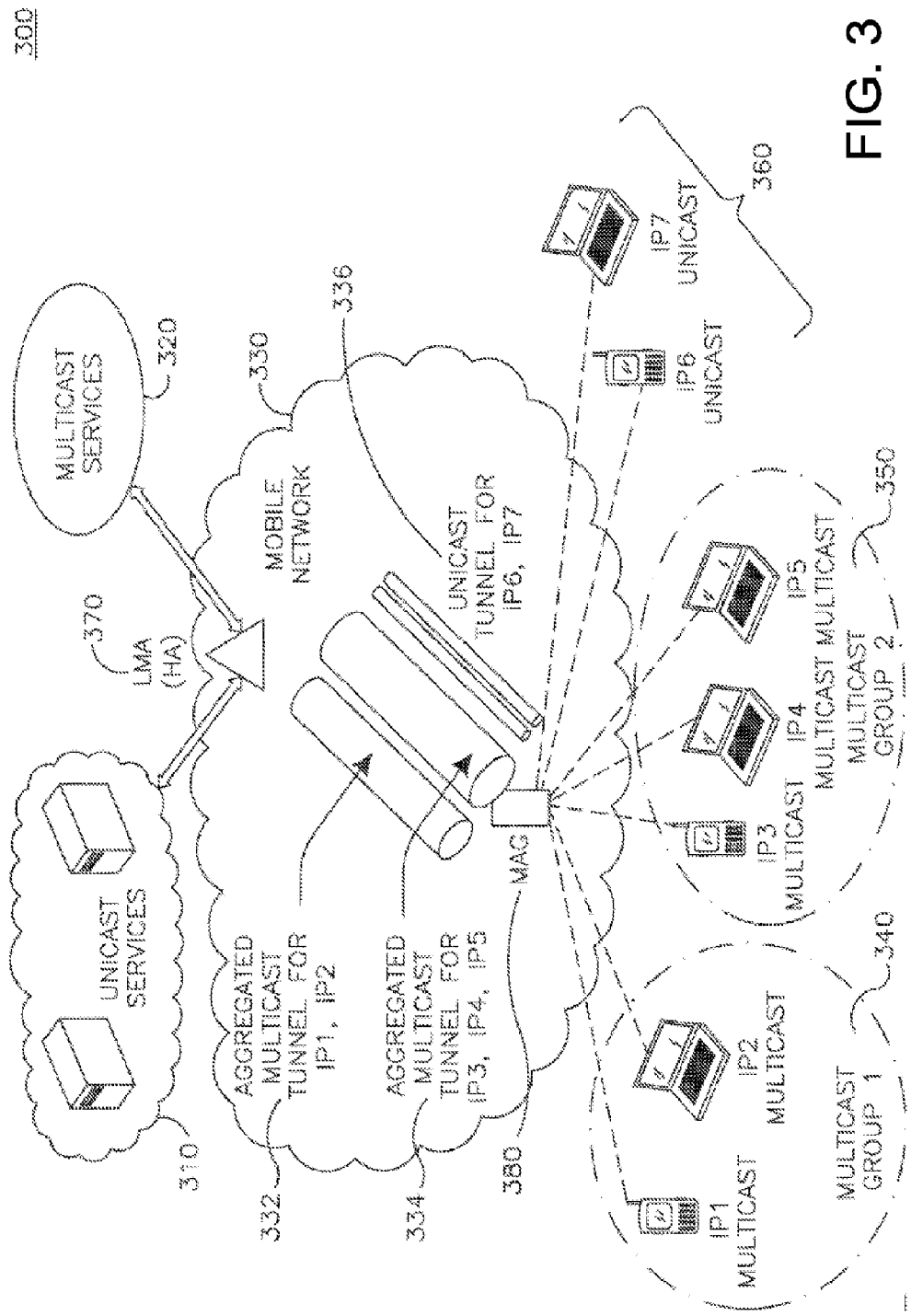
FIG. 3 shows an architecture of a PMIP multicast tunnel aggregation.

FIG. 3 shows an architecture of a PMIP multicast tunnel aggregation. Referring to FIG. 3, PMIP tunnels may be aggregated for the multicast WTRUs, (for example, the multicast group one 340 and multicast group two 350). If using the proxy binding update (PBU) message, a variable-length multicast options field (e.g., a portion or a segment) may be implemented in the PBU message. The PBU may be a request message sent by the MAG 380 to a WTRU's respective LMA for establishing a binding between the WTRU's HNP assigned to a predefined interface of a WTRU 340, 350, or 360 and its current CoA (e.g., proxy-CoA). The WTRU's respective LMA may be connected either to the unicast services 310 or the multicast services 320. The multicast options field may include a multicast CoA. A specific multicast CoA may be associated with the aggregated multicast tunnel 332 or 334 ending at the MAG 380. Alternatively, a multicast flag may be implemented in the PBU message and/or another message can be used to signal multicast information.

The multicast aggregated tunnels 332 and 334 may be pre-configured. For example, they may pre-exist between the LMA (Home Agent) 370 and the MAG 380, even before any WTRUs 340, 350, or 360 subscribe to the multicast services, for example. The LMA 370 and the MAG 380 may exchange information indicating that they both support multicast services using the messages described herein. Multicast WTRUs 340 and 350 may be added to the tunnel at the time they are attached to the mobile network 330.

Alternatively, multicast aggregated tunnels 332 and 334 may be dynamic. Multicast aggregated tunnels may not exist before any multicast services are used. When multiple WTRUs 360 establish unicast tunnels 336 for the multicast services, the LMA 370 and the MAG 380 may combine these unicast tunnels 336 into an aggregated multicast tunnel, 332 or 334.

A WTRU 340, 350, 360 may indicate a request for the multicast services to MAG 380 in several ways. For example, WTRU 340, 350, 360 may use MLD/IGMP messages to indicate a multicast request to MAG 380 or the WTRU 340, 350, 360 may include multicast information in a router solicitation message.

Both the LMA 370 and the MAG 380 may initiate the establishment of the aggregated tunnels for the multicast services. For initiation of tunnel aggregation from the MAG 380 to the LMA 370, a PBU message may be used to initiate the process by adding a flag in the multicast options field, or another message may be used. Multicast information may be stored at the LMA 370 and/or the MAG 380. Such multicast related information may be: multicast channels, the WTRUs that are subscribed to each multicast service, and/or each WTRU's respective network attachment.

A multicast tunnel may be unidirectional for downlink (e.g., downlink only) traffic, or bidirectional (e.g., uplink and downlink communication). Control information, such as the Multicast Listener Discovery (MLD)/IGMP messages, may be sent over unicast tunnels or over aggregated multicast tunnels. For multicast and unicast services, aggregated multicast and unicast tunnels may co-exist between the LMA 370 and the MAG 380. A WTRU 360 with a unicast tunnel may also be associated with a multicast CoA. For example, a WTRU may have unicast tunnels 336 and aggregated multicast tunnels 332, 334.

Further, one or multiple multicast tunnels may exist. Such options may include one multicast tunnel with one multicast CoA to serve all multicast services, multiple multicast tunnels providing separate different multicast services, or a combination of such options. The MAG 380 may indicate whether multicast service is supported and/or available (e.g., in a router advertisement message).

Figure 4:
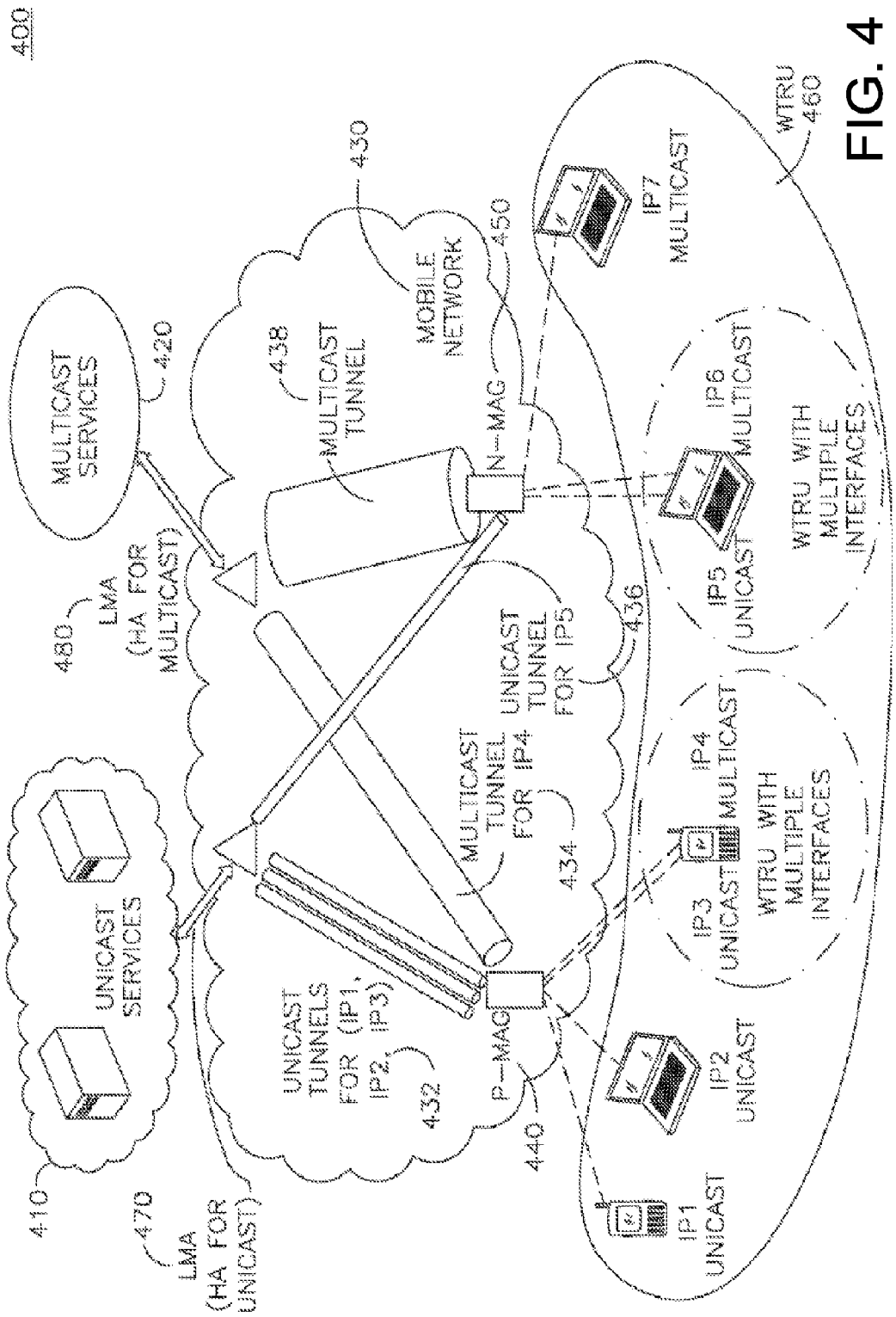
FIG. 4 illustrates a dedicated multicast LMA architecture.

FIG. 4 illustrates a dedicated multicast LMA architecture 400 in which an LMA 470 may be dedicated for unicast services 410 and/or an LMA 480 may be dedicated for multicast services 420. Multiple LMAs 470 and 480 may be used for each type of service, for example, depending on the deployment of the respective network.

A WTRU 460 may have multiple interfaces. The WTRU 460 may use the multiple interfaces to establish a unicast connection 432, 436 with the unicast LMA 470, and/or a multicast tunnel 434, 438 with the multicast LMA 480, respectively (e.g., in parallel). The WTRU 460 may have more than one home agent (HA). In this architecture, the division of LMAs may be based on a particular service used. The WTRU 460 may move from the P-MAG 440 to the N-MAG 450

Figure 5A:
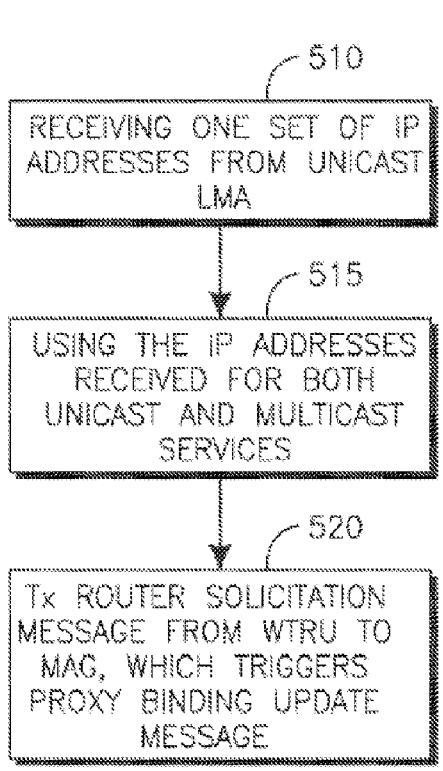
FIGS. 5A and 5B show a flow diagram of the dedicated multicast services as illustrated in FIG. 4.
Figure 5B:
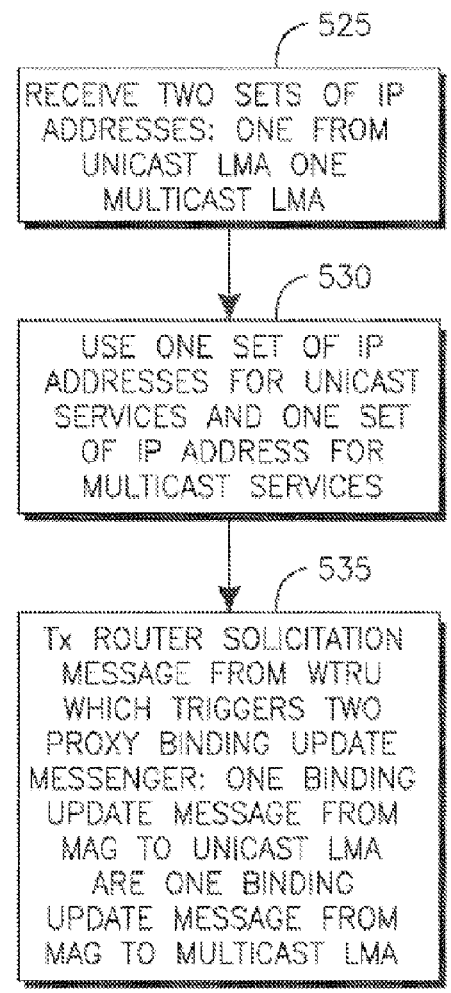

FIGS. 5A and 5B show flow diagrams of dedicated multicast services as illustrated in FIG. 4. Referring to FIG. 5A and FIG. 5B, details for the multicast services are described. Example embodiments are described in FIG. 5A and in FIG. 5B, where the IP address assignment may be used to support multicast services.

As illustrated in FIG. 5A, one set of IP addresses may be assigned and/or received at 510 from the LMA HA for unicast 470 to the WTRU 460. At 515, the IP addresses may be used by the WTRU 460 for unicast services 410 and/or multicast services 420. The WTRU 460 may transmit a router solicitation message at 520 to the serving MAG (e.g., P-MAG 440 and/or N-MAG 450), which may trigger a PBU message from the serving MAG to the unicast LMA 470.

As shown in FIG. 5B, multiple (e.g., two) sets of IP addresses may be assigned at 525 to the WTRU 460. For example, one set of IP addresses may be assigned from the unicast LMA HA 470 for unicast 410, while a different set of IP addresses may be assigned from the multicast LMA HA 480 for multicast 420, as illustrated at 530. The WTRU 460 may transmit the router solicitation message at 535 to the serving MAG (e.g., P-MAG 440 and/or N-MAG 450). The router solicitation message may trigger multiple (e.g., two) PBU messages. For example, one or more messages may be triggered from the serving MAG (e.g., P-MAG 440 and/or N-MAG 450) to the unicast LMA 470 and another one or more messages may be triggered to the multicast LMA 480.

According to an example embodiment, the WTRU 460 may not use unicast services. In this embodiment, the WTRU 460 may receive the IP addresses from the multicast LMA 480 for multicast services 420 through a PBU message from the serving MAG (e.g., P-MAG 440 and/or N-MAG 450) to the multicast LMA 480.

A binding update list that may be maintained by the MAG (e.g., P-MAG 440 and/or N-MAG 450) may be updated to have entries for a binding of the WTRU 460 with both the unicast LMA 470 for unicast traffic and the multicast LMA 480 for multicast traffic.

The multicast traffic and unicast traffic forwarding may be handled by the MAG (e.g., P-MAG 440 and/or N-MAG 450) by discriminating between the unicast and multicast traffic received related to a WTRU 460. The MAG (e.g., P-MAG 440 and/or N-MAG 450) may be able to discriminate by looking at source and/or destination addresses. The MAG (e.g., P-MAG 440 and/or N-MAG 450) may forward the traffic on the correct interface.

For example, in FIG. 5A, when there is uplink traffic (e.g., from the WTRU 460 to the serving MAG), the serving MAG (e.g., P-MAG 440 and/or N-MAG 450) may be able to determine if the uplink traffic may be (e.g., may be desired to be) forwarded to the unicast LMA 470 for unicast traffic and/or the multicast LMA 480 for multicast control signaling. For the downlink traffic, since there may be an interface (e.g., one interface) at the WTRU 460, the serving MAG (e.g., P-MAG 440 and/or N-MAG 450) may have a mapping of the tunnels for unicast tunnels and/or multicast tunnels to the WTRU 460.

As another example in FIG. 5B, when different IP addresses are used for unicast services 410 and multicast services 420, the serving MAG (e.g., P-MAG 440 and/or N-MAG 450) may map the tunnels with the interfaces of the WTRU 460, in a manner similar to mapping in PMIP multi-homing. PMIP may allow mobile nodes to connect to a PMIP (e.g., PMIPv4, PMIPv6, or another version) domain through multiple interfaces for simultaneous access. When a mobile node connects to a PMIP (e.g., PMIPv4, PMIPv6, or another version) domain through multiple interfaces for simultaneous access, the local mobility anchor may allocate a mobility session for each of the attached interfaces. Each mobility session may be managed under a separate Binding Cache entry and/or with its own lifetime. When multicast services exist and unicast services do not exist, the serving MAG (e.g., P-MAG 440 and/or N-MAG 450) may map the multicast tunnel with the WTRU 460, in a manner similar to the unicast traffic.

A policy profile may be used to determine unicast and/or multicast implementations for a WTRU 460. The policy profile of the WTRU 460 may be stored in the policy server. The policy profile may be updated by storing the IP (e.g., PMIPv4, PMIPv6, or another version) addresses of the LMA for unicast LMA 470) and/or the LMA for multicast (e.g., LMA 480). With the use of this information, the serving MAG (e.g., P-MAG 440 and/or N-MAG 450) of the WTRU 460 may be able to obtain the multicast LMA addresses.

Alternatively, or additionally, the MAC (e.g., P-MAG 440 and/or N-MAG 450) may maintain a multicast policy profile, which may map one or many LMA addresses to certain multicast groups, multicast options, and/or the like. A MAG (e.g., P-MAG 440 and/or N-MAG 450) may be able to attach to multiple LMAs. For example, a MAG (e.g., P-MAG 440 and/or N-MAG 450) may have a connection to the unicast LMA, and may connect to the multicast LMA, for example, if the IP address assignment as described in FIG. 5A is used. In this case, the connection to the unicast LMA 470 may or may not be used, because that may be where the IP address of the WTRU may be assigned. A MAG (e.g., P-MAG 440 and/or N-MAG 450) may have a connection to either the unicast LMA 470 or the multicast LMA 480 if the IP address assignment as described in FIG. 5B is used. In this example, the IP addresses of the WTRU 460 may be assigned from either of the LMAs 470,480 depending on the type of services (either unicast or multicast) used.

Figure 6:
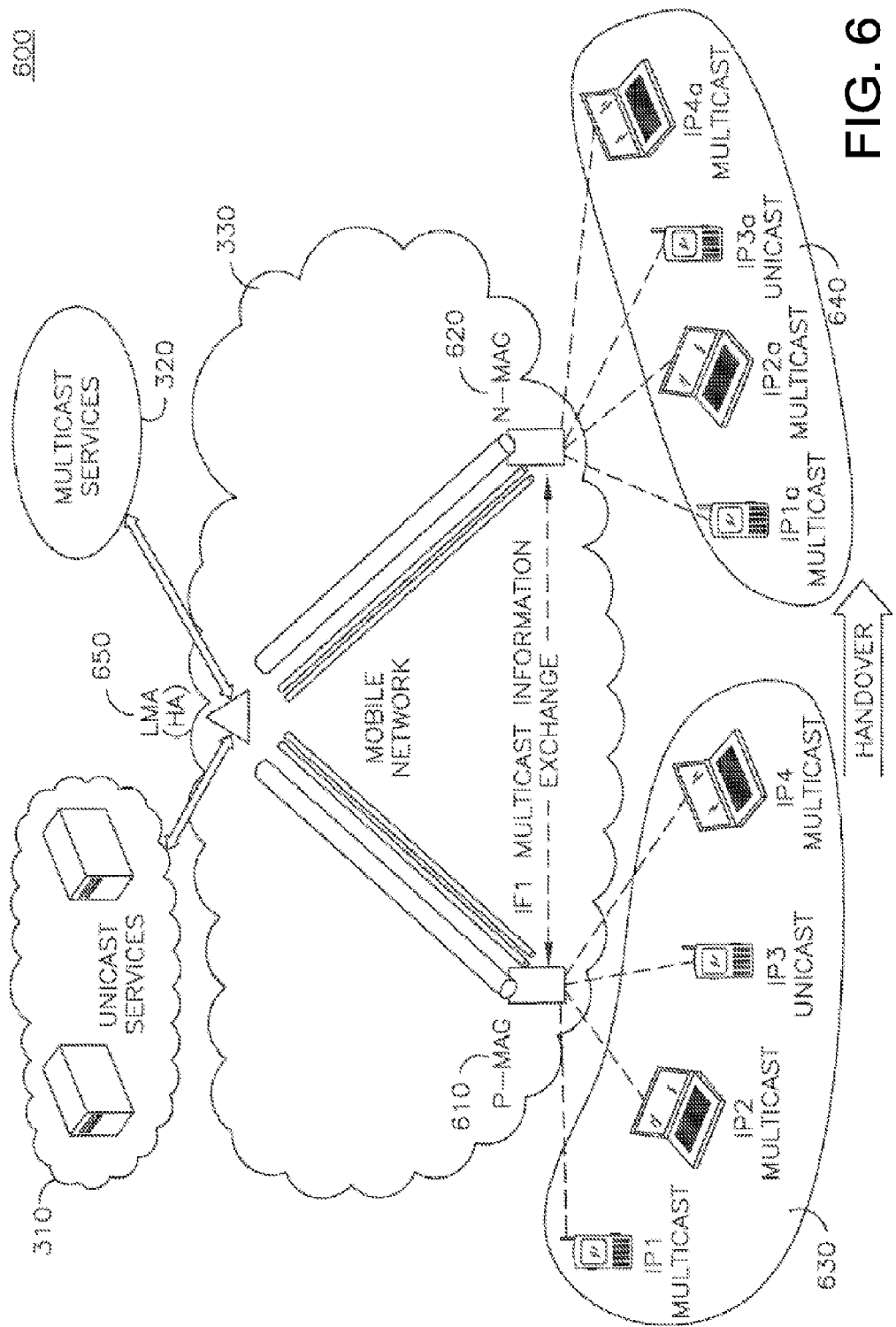
FIG. 6 shows the architecture of PMIP intra-LMA multicast mobility enablement.

FIG. 6 shows the architecture 600 of PMIP intra-LMA multicast mobility enablement. The embodiment shown in FIG. 6 may be similar to the embodiment shown in FIG. 3. In the embodiment illustrated in FIG. 6, all or some of the WTRUs (e.g., WTRUs 630 or WTRUs 640) may move from a previously attached MAG (e.g., P-MAG 610) to a newly attached MAG (e.g., N-MAG 620). An imminent handover (HO) trigger may come from the WTRU or the network. The HO may be transmitted as a result of lower layer signaling, for example, degraded signal strength, increased packet loss, and/or the like. One example of the lower layer signaling may be a link going down message in 802.21.

Figure 7A:
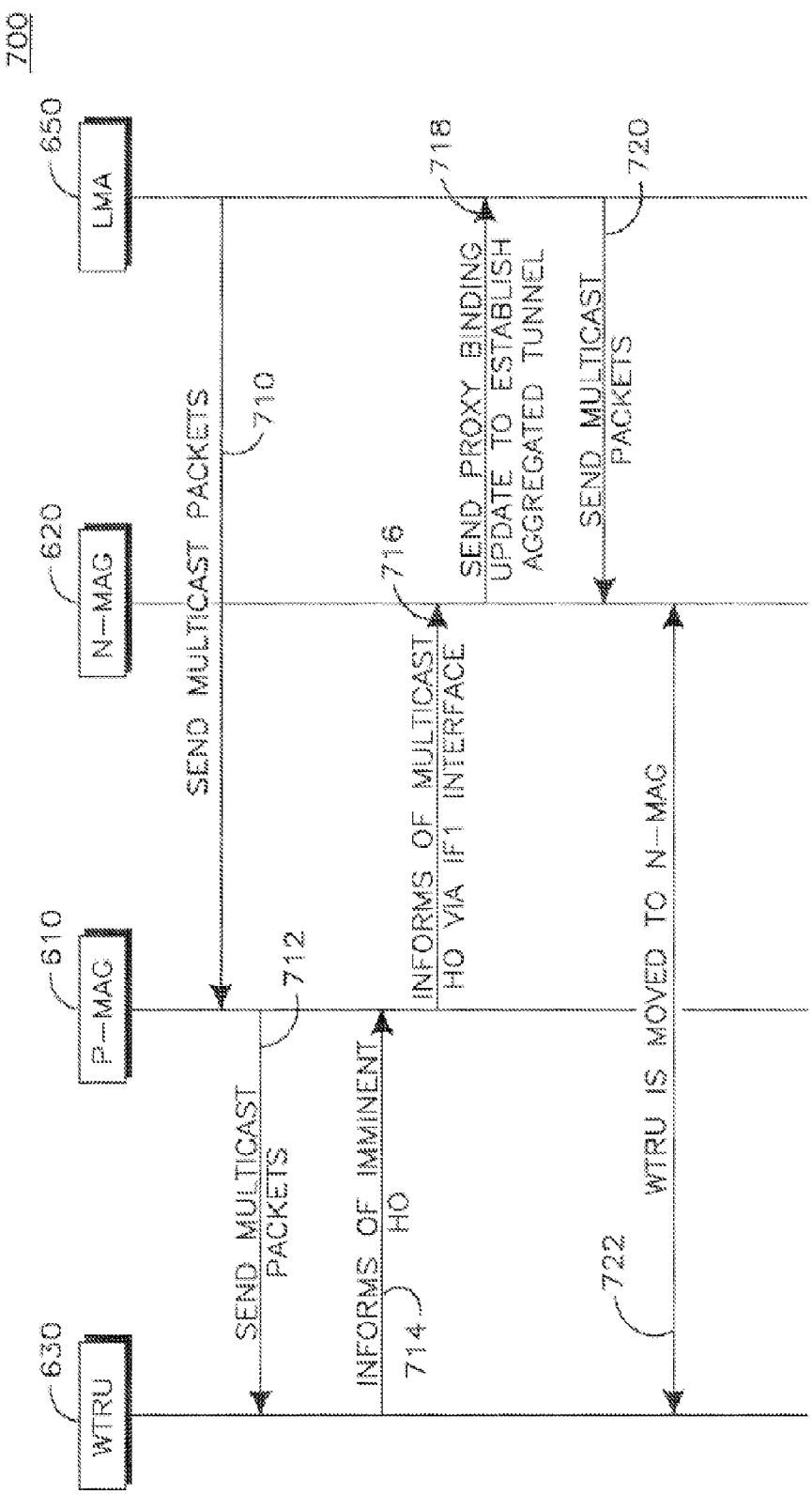
FIGS. 7A and 7B show a communication between the entities of the network for an intra-LMA multicast mobility as illustrated in FIG. 6.
Figure 7B:
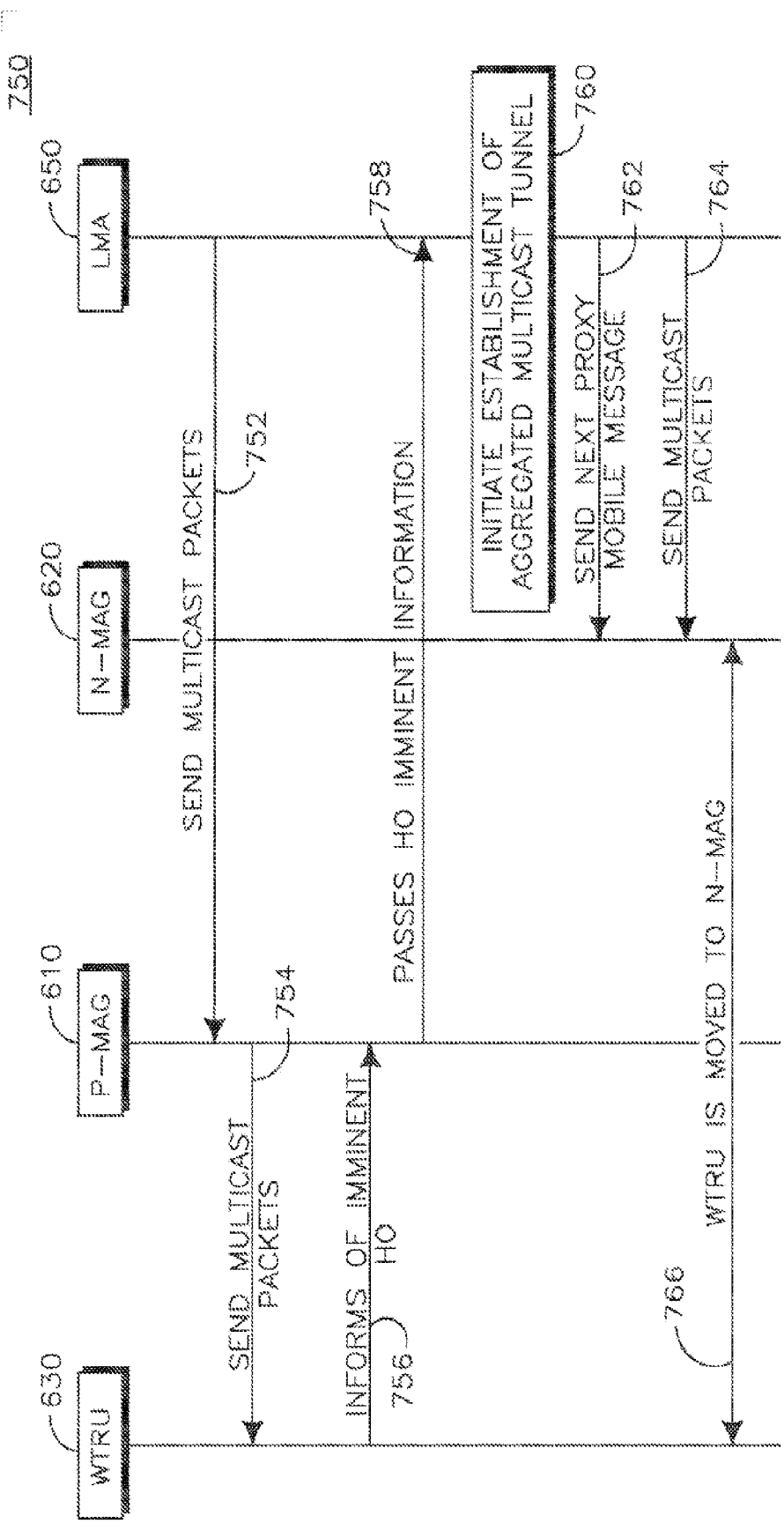

FIGS. 7A and 7B show example embodiments of communication between the entities of the network for an intra-LMA multicast mobility as illustrated in FIG. 6. Referring to FIGS. 7A and 7B, they show a communication path for the PMIP intra-LMA multicast mobility 700 and 750, respectively. In FIG. 7A, the LMA 650 may send multicast packets at 710 to the P-MAG 610. The P-MAG 610 may send multicast packets at 712 to the WTRU 630. The WTRU 630 may inform the P-MAG 610 of imminent handover (HO) at 714. The P-MAG 610 may inform the N-MAG 620 of the multicast HO via a new interface, IF1, at 716 between the P-MAG 610 and the N-MAG 620. Alternatively, or additionally, the imminent HO trigger and IF1 interface may be applied to unicast services. The N-MAG 620 may send a PBU message to the LMA 650 to establish an aggregated tunnel at 718. The multicast options with a multicast CoA may be provided to the LMA 650 by the N-MAG 620. The LMA 650 may send multicast packets to the N-MAG 620, prior to actual HO at 720. The WTRU 630, which may be associated to the pre-established aggregated tunnel, may move to the N-MAG 620, and may receive multicast packets from the aggregated tunnel at 722. On a condition that the aggregated tunnel between the LMA 650 and the P-MAG 610 is not used, the aggregated tunnel may be removed.

As shown at FIG. 7B, the LMA 650 may send multicast packets at 752 to the P-MAG 610. The P-MAG 610 may send multicast packets to the WTRU 630 at 754. At 756, the WTRU 630 may inform the P-MAG 610 of the imminent HO. The P-MAG 610 may pass the HO imminent information to the LMA 650 at 758. The LMA 650 may initiate establishment of an aggregated multicast tunnel at 760 between the LMA 650 and the N-MAG 620. The LMA 650 may send a Proxy Mobile IP message to the N-MAG 620 to establish the multicast tunnel at 762. On a condition that the LMA 650 is aware of the received imminent HO, the LMA 650 may initiate the establishment of an aggregated multicast tunnel between the LMA 650 and the N-MAG 620 at 760. The LMA 650 may send multicast packets to the N.-MAG 620 at 764. The multicast packets sent at 764 may be sent prior to the actual HO, for example. The WTRU 630, which may be associated to the pre-established aggregated tunnel, may move to the N-MAG 620, and may receive multicast packets from the aggregated tunnel at 766. On a condition that the aggregated tunnel between the LMA 650 and the P-MAG 610 is not used, the aggregated tunnel may be removed.

Alternatively, or additionally, the imminent HO trigger may come from the network. The trigger may be a result of the network load balancing or for a maintenance purpose (e.g., the P-MAG 610 is going to be shutdown). The network trigger may come to the LMA 650 or the P-MAG 610, for example. On a condition that the P-MAG 610 is aware of the received imminent HO, the P-MAG 610 may inform the LMA 650 of the HO directly, and/or inform the N-MAG 620 of the HO. This embodiment may proceed similarly to the embodiment above related to FIGS. 7A and 7B, where handover may be triggered by a WTRU.

Alternatively, after the establishment of the aggregated tunnel, multicast traffic may be sent from the LMA 650 to the N-MAG 620. The N-MAG 620 may send a PBU message to the LMA 650 after the WTRU 630 is detected on the network. However, this may cause a longer delay compared to other embodiments described herein where the tunnel may be pre-established and then multicasting may be started.

In another alternative embodiment, a multicast group join message may be transmitted on the targeted network before an HO. The multicast information obtained by the N-MAG 620 prior to the actual HO, as described above in FIGS. 7A and 7B, may facilitate N-MAG 620's enablement of multicast services before the attachment of the WTRU 630. The multicast information obtained by the n-access router (n-AR), on a condition that the PMIP is not used, prior to the actual HO may facilitate n-AR enablement of the multicast services before the attachment of the WTRU.

In another alternative embodiment, a mobility management entity in the network may be informed of the imminent HO. The mobility management entity may join the multicast group listened to by the WTRU with the appropriate multicast router on the targeted network before triggering the HO.

Another alternative may utilize a fast triggering multicast group 'join' message after L3 HO. The mobility management entity that controls the HO may trigger the sending of an MLD/IGMP report to join the multicast group as soon as the HO is complete. This may be done immediately, instead of waiting for a query from the multicast router, and thus may reduce the delay before resuming the multicast services.

The embodiments described herein may be used independently or jointly. For example, when some of the embodiments are used together, and the multicast group join prior to HO may not work, the fast triggering multicast group join message after HO may succeed in reducing the service delay.

Figure 8:
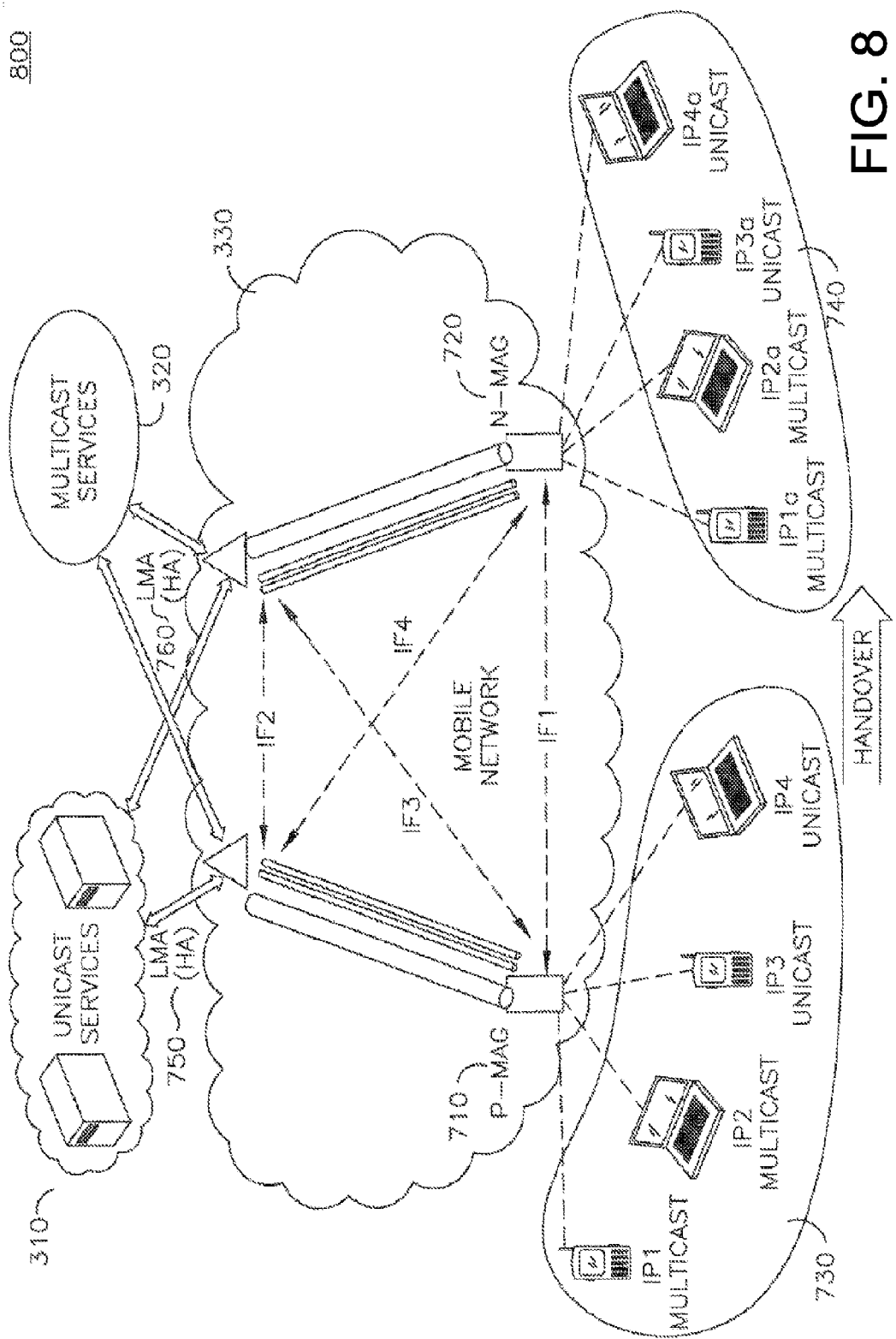
FIG. 8 shows the architecture of PMIP inter-LMA multicast mobility enablement.

FIG. 8 shows the architecture 800 of PMIP inter-LMA multicast mobility enablement. In this embodiment, the WTRUs 730 may move from the P-MAG 710 to the N-MAG 720. The P-MAG 710 and the N-MAG 720 may belong to different LMAs, (e.g., LMA 750 and LMA 760, respectively). Each LMA 750 and LMA 760 may provide unicast and/or multicast services. The method described in FIG. 6 for a single LMA multicast mobility may be used in conjunction with additional interfaces to inform the target LMA 750 and 760 to enable the multicast services used. The interface IR may be used for multicast information exchange between the source and target MAGs, P-MAG 710 and N-MAG 720. The interface IF2 may be used for multicast information exchange between the source and the target LMAs, LMA 750 and LMA 760. The interface IF3 may be used for multicast information exchange between the source MAG 710 and the target LMA 760. The interface IF4 may be used for multicast information exchange between the source LMA 750 and the target MAG 720. These interfaces may be alternatives and may or may not be available at the same time.

Figure 9:
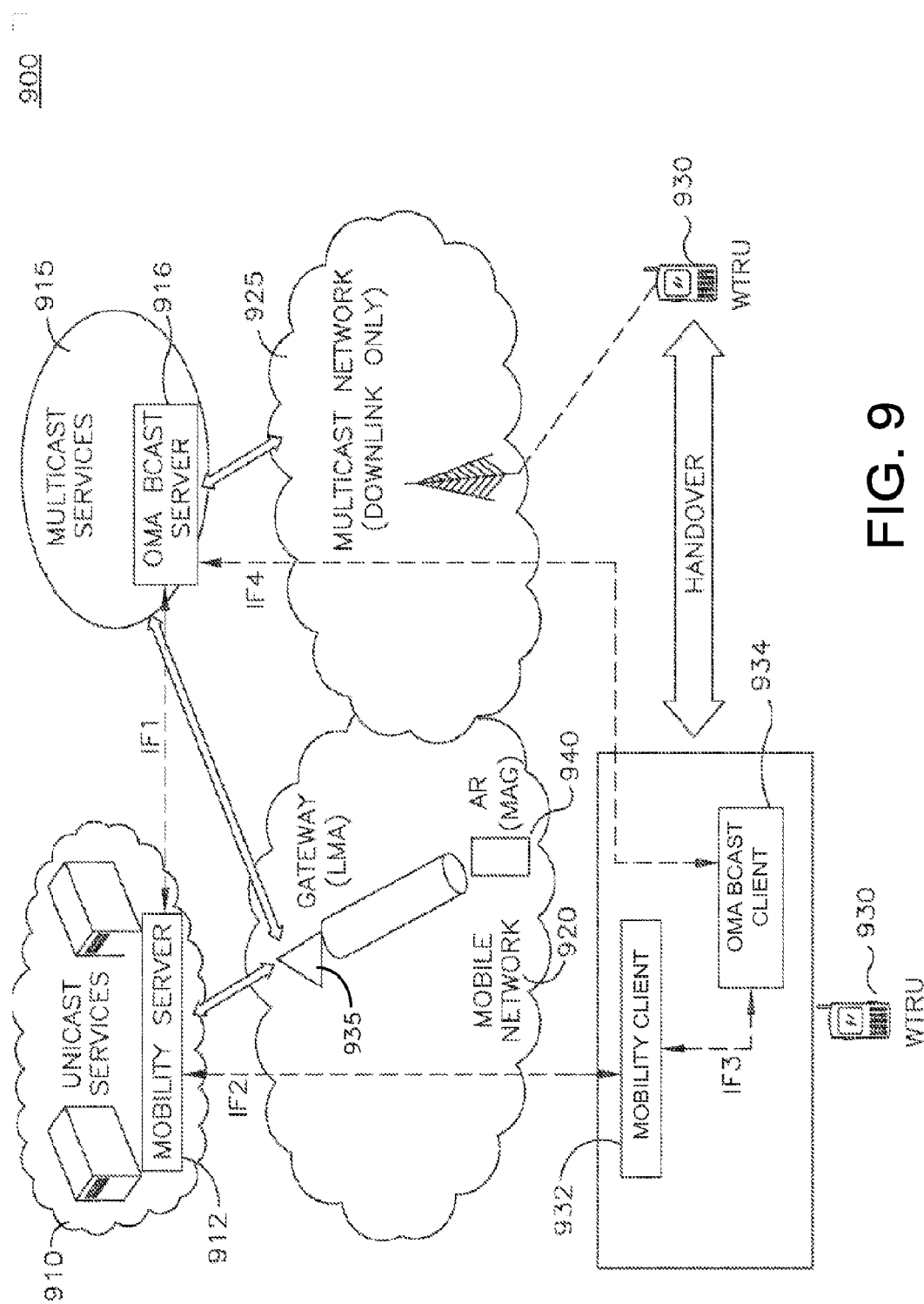
FIG. 9 shows the architecture of multicast mobility in a hybrid network.

FIG. 9 illustrates a network 900 that may extend a single type of network to a hybrid network for mobility. Referring to FIG. 9, a bi-directional mobile network combined with a downlink (e.g., downlink only) multicast network 925 is shown. In such a hybrid network, the HO may occur from the bi-directional network to a downlink (e.g., downlink only) multicast network 925. In a first example, the HO may be WTRU 930 triggered, using interface IF3 and interface IF4 for example. A mobility client entity 932 in the WTRU 930 may detect the imminent HO. The mobility client 932 may inform a multicast service entity 934 (e.g., OMA BCAST functionalities 934 in the WTRU) via the interface IF3, for example. The multicast service entity 934 may inform its counterpart 916 in the network 915 (e.g., OMA service adaptation/distribution functionalities in the network) of the imminent HO via the interface IF4, for example, and/or may use service distribution in the downlink (e.g., downlink only) network 925. The interface IF4 may be an OMA BCAST-5 interface or any other interface that may be used to support the HO information, for example.

In another example, the HO may be WTRU 930 triggered using interfaces IF1 and/or IF2. A mobility client entity 932 in the WTRU 930 may detect the imminent HO. The mobility client entity 932 may inform the mobility server 912 in the network 910 (e.g., a media independent handover (MIH) server may be an example of mobility server) of the imminent HO via the interface IF2. The interface IF2 may be any interface that may be used for communication of such information, such as an MIH protocol or other similar interface for example. The mobility server 912 may be located in the unicast service network 910, multicast service network 915, and/or in a different domain from the unicast and/or multicast networks. The mobility server 912 may inform the OMA BCAST server 916 of the imminent HO and may use service distribution in the downlink (e.g., downlink only) network 925 via the interface IF1. The interface IF1 may be any interface capable of communicating information between the mobility server 912 and the OMA BCAST server 916.

In an example embodiment, the network 920 may trigger an HO using the interface IF1. In this case, the mobility server 912 may inform the OMA BCAST 916 via the interface IF1. In another example embodiment, the network 920 may trigger an HO using the interface IF2, interface IF3, and/or interface IF4. On a condition that the interface IF1 does not exist, the mobility server 912 may inform the mobility client 932 using the interface IF2. The mobility client 932 may inform the OMA BCAST client 934 using the interface IF3. The OMA BCAST client 934 may inform the OMA BCAST server 916 using the interface IF4. In another example embodiment, mobility may be supported from the MAG 940 and/or the LMA 935 in the distribution network.

A MAG (e.g., AR or PMIP) 940 and an LMA (Gateway) 935 may get information about a plurality of WTRUs 930 including the respective mobility and multicast services information. The MAG 940 and/or the LMA 935 may interface with the multicast service network 915, or multicast distribution network (e.g., downlink only network) 925 to ensure the delivery of the multicast services when a WTRU 930 moves to the downlink (e.g., downlink only) multicast network 925.

The HO may occur from a downlink (e.g., downlink only) multicast network 925 to a bidirectional network 920. The network may trigger the HO. The WTRU 930 may be informed of the HO in the downlink control information. An imminent HO indication (e.g., information) may be passed to the bi-directional network via interfaces in the network side, such as IF1 for example. Alternatively, the WTRU 930 may trigger the HO. An uplink connection may be used for the WTRU 930 to inform the network of the imminent HO. The interfaces described herein fir the HO from a bi-directional network 920 to a downlink (e.g., downlink only) network 925 may be used to pass the HO information from the WTRU 930 to the network. According to an example embodiment, the methods, examples, and embodiments described herein that are related to FIG. 9 for mobility in hybrid networks may not use L3 or L2 mobility, and PMIP may or may not be used.

IP multicast traffic offload may be managed as described herein. For example, in certain session establishment scenarios (e.g., PMIPv6 with PBU/PBA, tunnel setup, and/or MN address configuration procedures), when an MN attaches to the network, the MAG may send an MLD query message. The MLD query message may be replied to, for example, by the MN by sending an MLD report. When (e.g., any time) the user desires to subscribe to a multicast service, the MN may send an MLD report. The MAG may have different procedures for subscribing to a multicast group. For example, the MAG may subscribe to a multicast group via a tunnel with the LMA unicast such as a RFC 6224 ("Base Deployment for Multicast Listener Support in Proxy Mobile IPv6 (PMIPv6) LMA unicast, via a tunnel with a Multicast Tree Mobility Anchor (MTMA), such as a IEFT draft-zuniga-multimob-smspmip ("Support Multicast Services Using Proxy Mobile IPv6") MTMA, and/or via local subscription/routing, such as a IEFT draft-sijeon-multimob-direct-routing-pmip6 ("PMIPv6 Multicasting Support using Native infrastructure") local subscription/routing.

The content to be multicast may be located in different places. For example, the content may be locally available (e.g., TV channels may be offered in the visited domain or network), and/or the content may be stored remotely (e.g., the TV channels may be offered in the home domain or network). In case the content is available remotely (e.g., at the home domain or other remote subscription point), the subscription may be via a tunnel to the remote network (e.g., the home domain other remote subscription point). If the content is available locally, the subscription may be locally at the MAG (e.g., the local break point) instead of via the remote network (e.g., the home domain or other remote subscription point). The MAG may have to choose (e.g., select) an approach to be taken to subscribe to access content requested by an MN.

If the multicast group address is local (e.g., the scope is the local domain), the MAG may get access to the multicast group via local subscription (or routing, if the MAG is a multicast router). If the multicast group address is global (e.g., the scope is greater than the scope of the local domain), the MAG may have to decide among different available procedures which may be achieved, for example, using: (1) a static pre-configuration procedure and/or (2) a dynamic configuration procedure, as described herein for example. In certain representative embodiments, the MN may express its preferences upon subscribing to the content. In this case, the resolution of which procedure may be at least partially mobile-based (e.g., as compared to operator-based).

Figure 10:
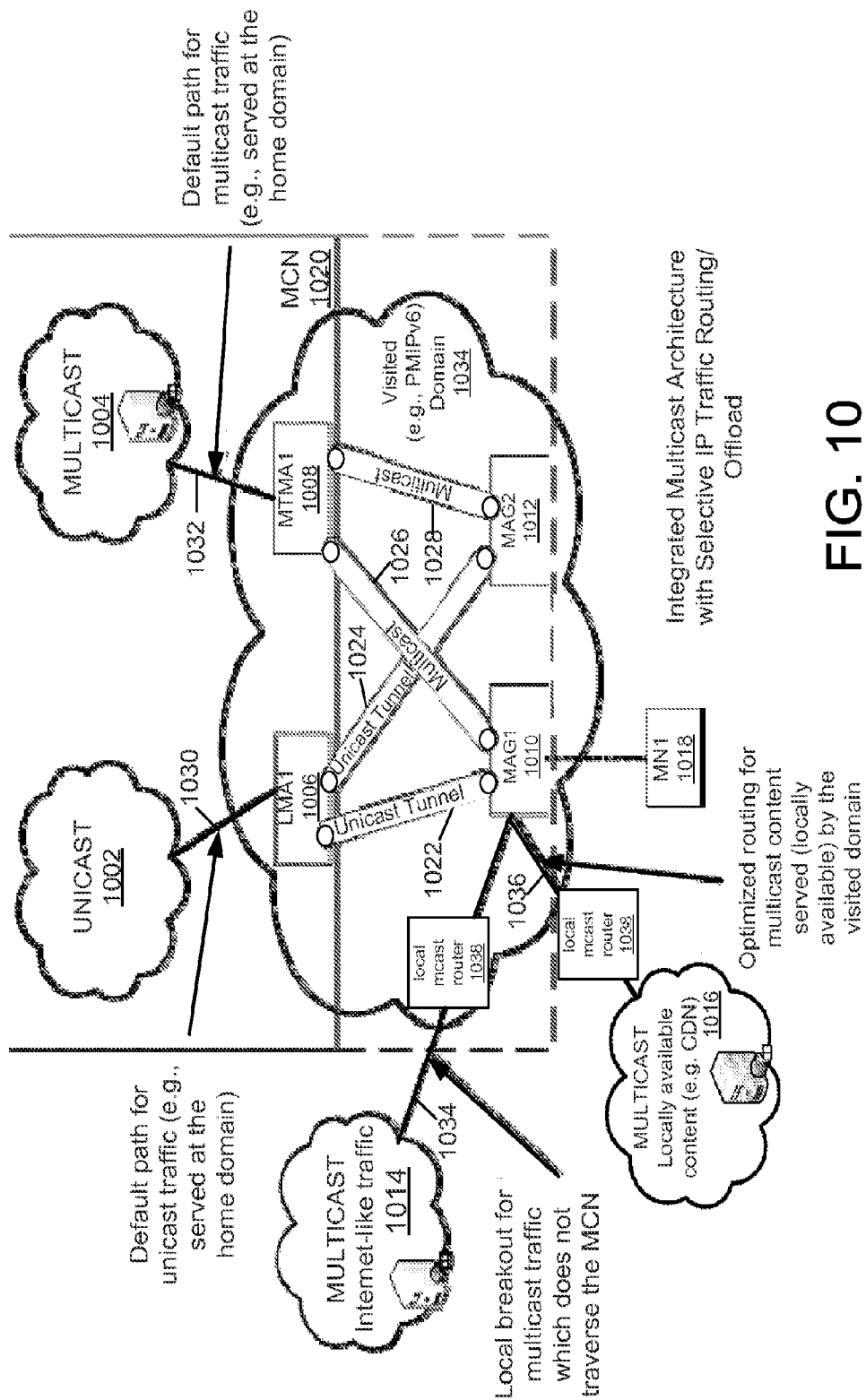
FIG. 10 is a diagram illustrating a multicast architecture.

FIG. 10 illustrates a multicast architecture in which an LMA1 1006 and/or an MTMA1 1008 may be used for unicast 1002 services and/or multicast 1004 services (e.g., traffic). The unicast 1002 and/or multicast 1004 services (e.g., traffic) may be transmitted from a remote domain (e.g., home domain), for example, to the visited domain 1034 for being accessed by the MN1 1018. The visited domain 1034 may be, for example, an IP domain (e.g., PMIPv4, PMIPv6, or another version) or other network being visited by the MN1 1018 for accessing such services. The visited domain 1034 may include, or may be in communication with, LMA1 1006, MTMA1 1008, MAG1 1010, and/or MAG2 1012, one or more of which may be implemented in providing the unicast 1002 and/or multicast 1004 services to the MN1 1018.

An LMA1 1006 may be used for accessing unicast 1002 services from the remote domain (e.g., home domain) An MTMA1 1008 may be used for accessing multicast 1004 services (e.g., traffic) from the remote domain (e.g., home domain). For example, a default path 1030 for the unicast 1002 traffic may be routed to the LMA1 1006 and/or a default path 1032 for the multicast 1004 traffic may be routed to the MTMA1 1008. The management communication network (MCN) 1020 may include the LMA1 1006 and/or the MTMA1 1008. The MCN may be a data communication network (DCN) that may support Layer 1 (e.g., physical layer), Layer 2 (e.g., data-link layer), and/or Layer 3 (e.g., network layer) functionality for distributed management communications related to the management plane.

A unicast tunnel 1022 (e.g., an IP tunnel, such as a PMIPv4 tunnel, a PMIPv6 tunnel, or another version of IP tunnel) may be established between the LMA1 1006 and the MAG1 1010 for LMA signaling and unicast 1002 traffic. Similarly, a unicast tunnel 1024 (e.g., an IP tunnel, such as a PMIPv4 tunnel, a PMIPv6 tunnel, or another version of IP tunnel) may be established between the LMA1 1006 and the MAG2 10112 for LMA signaling and unicast 1002 traffic. A multicast tunnel 1026 may be established between the MTMA1 1008 and the MAG1 1010 for multicast traffic. Similarly, a multicast tunnel 1028 may be established between the MTMA1 1008 and the MAG2 1012 for multicast traffic.

According to an example embodiment, the MN1 1018 may be visiting a network, such as the visited network 1034 for example, and may be served by MAG1 1010. Content may be stored in multicast servers (e.g., content servers) or multicast content networks (e.g., content delivery networks). The stored content may be retrieved by the MN1 1018 using multicast procedures. The multicast content may be obtained locally (e.g., from locally accessible storage) and/or remotely (e.g., from remotely accessible storage). The routing of the multicast content may differ based on whether the content is locally and/or remotely available. For example, the content may be locally available if it is stored in the same visiting domain or network (e.g., visited network 1034) as the MN1 1018, in a domain or network (e.g., visited network 1034) served by the same MAG (e.g., MAG1 1010), and/or in a domain or network (e.g., visited network 1034) from which the content may be retrievable without traversing or using the MCN 1020. In an example embodiment, the MAG1 1010 may receive multicast 1014 services (e.g., Internet-like traffic) via a local breakout at 1034 for multicast traffic that does not traverse the MCN 122. According to another example embodiment, the MAG1 1010 may receive multicast 1016 services locally via multicast routing at 1036 of locally available content served by the visited domain 1034. The local routing may be performed using a content distribution network (CDN) for example.

As described herein, the content may be locally available to the MAG1 1010 because the content may be locally accessed at the MAG1 1010. The routing of locally available multicast content at 1034 and/or 1036 may be performed using a local multicast router 1038. The local multicast router may be included in the visited domain 1034 or another locally accessible domain. Additionally, the functionality of the local multicast router maybe included in the MAG1 1010. When the content is locally available to the MAG1 1010, the local multicast router 1038 may establish a connection (e.g., a direct connection) with the MAG1 1010 for providing the MN1 1018 with the content. By establishing a direct connection between the locally available multicast router 1038 and the MAG1 1010, the MN1 1018 may receive the content via the MAG1 1010 upon request. Additionally, the MN1 1018 may be part of a multicast group and any other mobile nodes (e.g., all mobile nodes) which may be part of the multicast group may request and receive the content locally from MAG1 1010.

According to another example, when the content is not locally available via the MAG1 1010, or when the content is remotely accessed for example, the MTMA1 1008 (e.g., which may serve the remote/home domain) may establish a connection with the content server storing the content (e.g., remotely) and may provide the content as multicast traffic via the multicast tunnel 1026 to MAG1 1010. The MN1 1018, and/or any other mobile nodes (e.g., all mobile nodes) which may be part of a multicast group requesting the content and which may be served by the MAG1 1010, may receive the content via the multicast tunnel 1026 and the MAG1 1010.

The multicast 1004 content that may be accessed by different MNs and/or groups of MNs associated with different MAGs. For example, the MTMA1 1008 may provide the multicast 1004 content to another MN and/or group of MNs (not shown) via MAG2 1012. The MAG2 1012 may receive the content via the multicast tunnel 1028 and may provide the content to the other MNs as described herein.

The content (e.g., multicast 1004 and/or unicast 1002 content) may be routed to and/or from the MN1 1018 according to various policies. For example, the MAG1 1010, the local multicast router 1038, and/or other network entities may be used to determine whether to provide locally available multicast content to the MN1 1018 based on one or more multicast policies. The multicast policies may be, for example, preconfigured policies stored statically at the MAG1 1010, the local multicast router 1038, and/or other network entities), dynamic policies determined and/or stored during operation, and/or policies determined based on indications from the MN1 1018. According to an example embodiment, the preconfigured policies may be determined and/or stored at the time of manufacture, while dynamic policies may be determined during processing after implementation in the field. According to another example embodiment, the preconfigured policies may be determined before and/or remain static during signal processing for a given connection, while dynamic policies may be determined based on signals being processed during a connection.

Figure 11:
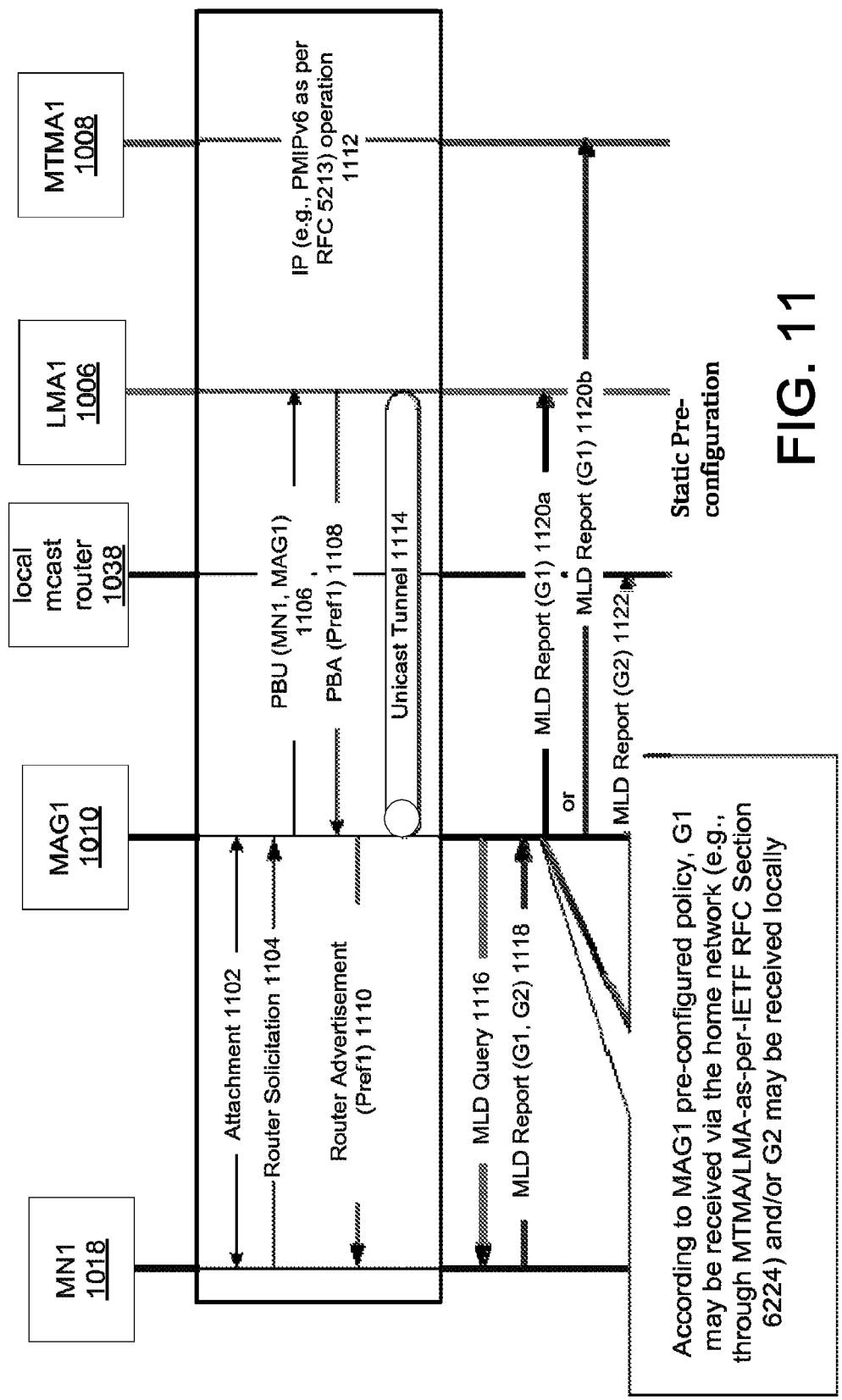
FIG. 11 is a diagram illustrating multicast discovery using the multicast architecture of FIG. 10.

FIG. 11 is a diagram illustrating an example implementation of multicast discovery. For example, the multicast discovery may be performed using static pre-configured policies. The diagram illustrated in FIG. 11 may be implemented using the multicast architecture of FIG. 10, for example. As illustrated in FIG. 11, the MAG1 1010 may use preconfigured policies/profiles that may define procedures for handling multicast content. The policies/profiles may include routing information and/or network management criteria. For example, the policies/profiles may include MN policies (e.g., configurations for different transmissions of multicast content based on MNs), user policies (e.g., configurations for different transmissions of multicast content based on users), network operator policies (e.g., configurations for different transmissions of multicast content predefined by a network operator), traffic or IP flow policies (e.g., configurations for different transmissions of multicast content based on the amount of traffic or IP flow), and/or other types of policies that may be implemented for routing content for example. The policies may be determined and/or implemented to conserve bandwidth by using locally available multicast content when available for example.

According to an example embodiment, a user policy may indicate that multicast traffic from user X should be transmitted through the remote/home network (e.g., via a tunnel with the MTMA1 1008/LMA1 1006), while traffic from user Y should be via local subscription. According to another example embodiment, a policy may be more complex and/or may incorporate multiple policy considerations. For example, a policy may indicate that traffic of type A from user X should go through the remote/borne network and/or traffic of type B from user X should be subscribed locally. Types of traffic and/or IP flows may be characterized by the multicast address, source of the content and multicast address for Source Specific Multicast (SSM), and/or by more complex selectors, such as 5-tuple or 6-tuple, among others. The MAG may be pre-provisioned with these policies through the use of common protocols (e.g., WSDL/SOAP, XML, OMA Device Management/Client Provisioning, Diameter, and/or Radius, among others).

Referring to FIG. 11, the MN1 1018 may register/attach to a visiting domain 1034 at 1102 via the MAG1 1010 of the visited domain 1034. For example, the attachment at 1102 may be an attachment at a communications layer (e.g., a layer 2 attachment) established between the MAG1 1010 and the MN1 1018. The MN1 1018 may send a router solicitation message to the MAG1 1010 at 1104 (e.g., after the attachment is established). At 1106, the MAG1 1010 may send a Proxy Binding Update (PBU) message to the LMA1 1006 to update the LMA1 1006 with the current location of the MN1 1018. The PBU message may include parameters corresponding to the MN1 1018 and/or MAG1 1010 for example. In response to the reception of the PBU message at 1106, the LMA1 1006 may send a Proxy Binding Acknowledgement (PBA) message to the MAG1 1010 at 11108 that may include the MN1 1018's home network prefix or prefixes, may generate a binding cache entry, and/or may set up its endpoint of a bi-directional unicast tunnel 1114 (e.g., an IP tunnel, such as a PMIPv4 tunnel, a PMIPv6 tunnel, or another version of IP tunnel). The MAG1 1010, after receiving the PBA message at 1108 for example, may set up its endpoint of the bi-directional unicast tunnel 1114. The MAG1 1010 may setup the forwarding for the MN1 1018's traffic. The MAG1 1010 may send a router advertisement message at 1110 to the MN1 1018. For example, the router advertisement message at 1110 may be sent on the access link. The router advertisement message may advertise the MN1 1018's remote/home network prefix or prefixes, as the hosted on-link prefix or prefixes for example. The MN1 1018 may attempt to configure its interface using modes that are permitted on the access link as indicated in the router advertisement message at 1110. The MTMA1 1008 may perform IP operation at 1112. For example, the IP operation at 1112 may include the PMIPv6 operation as described in Internet Engineering Task Force (IETF) Request for Comments (RFC) section 5213.

From the address configuration procedure (e.g., illustrated in FIG. 11 from 1102-1114) the MN1 1018 may have one or more addresses from its remote/home network prefix. For example, from the address configuration, the MN1 1018 may have one or more valid addresses from its remote/home network prefix at the current point of attachment. The LMA1 1006 may receive packets that may be sent to the MN1 1018 by other nodes (e.g., non-local nodes). The LMA1 1006 may forward these received packets to the MAG1 through the bi-directional unicast tunnel 1114 (e.g., an IP tunnel, such as a PMIPv4 tunnel, a PMIPv6 tunnel, or another version of IP tunnel). The MAG1 1010, after receiving the packet for example, may remove the outer header, and/or may forward the packets to the MN1 1018 (e.g., on the access link).

At 1116, the MAG1 1010 may send to the MN1 1018 a Multicast Listener Discovery (MLD) query to request one or more multicast groups associated with the MN1 1018. In response to the MLD query at 1116, the MN1 1018 may send an MLD report at 1118. The MLD report at 1118 may include information identifying multicast groups G1 and/or G2, as associated multicast groups of the MN1 1018. The MAG1 1010 may receive the MLD report from the MN1 1018 at 1118 and may determine, based on one or more pre-configured policies, how to provide multicast content to the MN1 1018. For example, based on the one or more pre-configured policies the MAG1 1010 may determine that the multicast group G1 content is to be provided via the MTMA1 1008 and the MAG1 1010 (e.g., from stored content at the remote/home network) and the multicast group G2 content is to be provided locally (e.g., directly) via the MAG1 1010 and the local multicast router 1038 (e.g., from locally available content). As such, the MAG1 1010 may send the MLD report of group G1 from the MN1 1018 to the MTMA1 1008 at 1120b and the MLD report of group G2 from the MN1 1018 to the local multicast router 1016 at 1122.

As previously shown in FIG. 10, the MTMA1 1008 and MAG1 1010 may setup a multicast tunnel 1026 to multicast content to mobile nodes in the visiting network (e.g., via MAG1 1010 to MN1 1018). The local multicast router 1038 may also multicast the content associated with group G2 via the MAG1 1010. The locally available content, however, may not be tunneled and/or may not traverse the MCN. As shown in FIG. 11, the MLD report for the multicast group G1 may be sent to the LMA1 1006 at 1120a and/or the MTMA1 1008 at 1120b. For example, the MAG1 1010 may select the MTMA1 1008 from the two choices based on one or more policies (e.g., predetermined polices). The LMA1 1006 may alternatively be used to receive the MLD report for the multicast group G1 (e.g., instead of MTMA1 1008). For example, in this case the MLD report of group G1 may be sent to the LMA1 1006 at 1120a, which may act as an anchor point for the multicasting operation.

Figure 12:
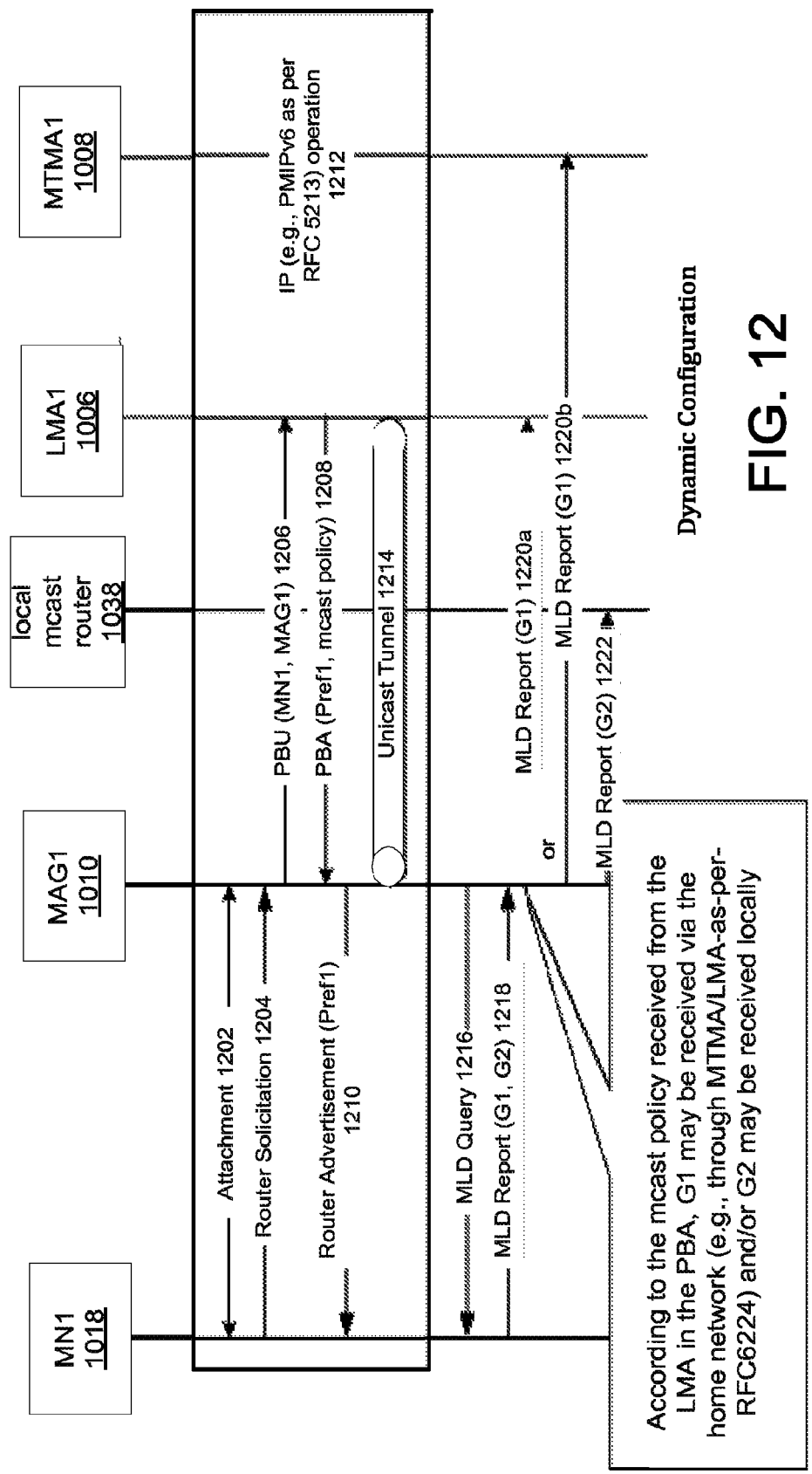
FIG. 12 is a diagram illustrating another multicast discovery using the multicast architecture of FIG. 10.

FIG. 12 is a diagram illustrating another example implementation of multicast discovery using various policies. As illustrated in FIG. 12, the MAG1 1010 may dynamically obtain policies indicating how to handle multicast traffic. For example, the policies may be obtained upon a user's registration and/or authentication to the visited domain 1034.

The signaling for the communications illustrated in FIG. 12 may include out-of-band signaling. For example, the MAG1 1010 may dynamically obtain/receive the information via out-of-band signaling (e.g., similarly to the pre-configured procedure illustrated in FIG. 11). Some examples of this signaling may include signaling via the Open Mobile Alliance (OMA) device management (DM)/client provisioning (CP) protocol signaling, the access network discovery and selection function (ANDSF) protocol signaling, the diameter protocol signaling, and/or the radius protocol signaling, among others. Extensions (e.g., PMIPv6/GTP extensions) may be implemented for dynamically obtaining/determining policy information. For example, the MAG1 1010 may receive from the LMA1 006 and/or MTMA1 1008 an extended PBA that may include an option fir the multicast handling policies of the MN1 1018. This option for traffic description may accommodate different types of policies, such as MN policies (e.g., configurations for different transmissions of multicast content based on MNs), user policies (e.g., configurations for different transmissions of multicast content based on users), network operator policies (e.g., configurations for different transmissions of multicast content predefined by a network operator), traffic or IP flow policies (e.g., configurations for different transmissions of multicast content based on the amount of traffic or IP flow), and/or other types of policies for example. The PBA may include extension fields associated with these parameters. The PBA extended information may be received using the PBA signaling even for MTMA implementation, as the procedure may be carried out during a unicast (e.g., PMIP/GTP) registration for example.

Referring to FIG. 12, the MN1 1018 may register/attach to a visiting network at 1202 via the MAG1 1010 of the visited network 1034. For example, a layer 2 attachment may be established at 1202 between the MAG1 1010 and the MN1 1018. The MN1 1018 may send a router solicitation message at 1204 (e.g., after the layer 2 attachment is established). The MAG1 1010 may send the Proxy Binding Update (PBU) message to the LMA1 1006 at 1206, for example, to update the LMA1 1006 with the current location of the MN1 1018. In response to the reception of the PBU message at 1206, the LMA1 1006 may send a Proxy Binding Acknowledgement (PBA) message at 1208 to the MAG1 1010. The PBA message at 1208 may include the MN1 1018's home network prefix or prefixes and/or an indication of one or more applicable multicast policies (e.g., the multicast policies themselves or a bit indicator of the policies). The LMA1 1006 may generate a binding cache entry and/or may set up its endpoint of a bi-directional IP tunnel 1214 (e.g., a PMIPv4 tunnel, a PMIPv6 tunnel, or another version of IP tunnel) to the MAG1 1010. The MAG1 1010, after receiving the PBA message at 1208 for example, may set up its endpoint of the bi-directional unicast tunnel 1214 (e.g., an IP tunnel, such as a PMIPv4 tunnel, a PMIPv6 tunnel, or another version of IP tunnel). The MAG1 1010 may setup the forwarding for the MN1 1018's traffic (e.g., based on the indication of the one or more policies received in the PBA message at 1208). The MAG1 1010 may send a router advertisement message to the MN1 1018 at 1210. For example, the router advertisement message may be sent on the access link advertising the MN1 1018's home network prefix or prefixes, as the hosted prefix or prefixes for example. The MN1 1018 may attempt to configure its interface using modes that are permitted on that access link as indicated in the router advertisement message. The MTMA1 1008 may perform IP operation at 1212. For example, the IP operation at 1212 may include the PMIPv6 operation as described in Internet Engineering Task Force (IFTF) Request for Comments (RFC) 5213.

At the end of the address configuration procedure (e.g., illustrated in FIG. 12 from 1202-1214), the MN1 1018 may have one or more addresses from its home network prefix (e.g., at the current point of attachment). The LMA1 1006 may receive packets that may be sent to the MN1 1018 (e.g., by nodes which are not local). The LMA1 1006 may forward these received packets to the MAG1 1010 through the bi-directional tunnel 1214. The MAG1 1010, after receiving the packets for example, may remove the outer header and/or may forward the packets on the access link to the MN1 1018.

At 1216, the MAG1 1010 may send to the MN1 1018 a Multicast Listener Discovery (MLD) query to request one or more multicast groups associated with time MN1 1018. In response to the MLD query, the MN1 1018 may send an MLD report at 1218. The MLD report at 1218 may include information identifying the multicast groups G1 and/or G2, as associated multicast groups of the MN1 1018. The MAG1 1010 may receive the MLD report from MN1 1018 and may determine, based on the one or more multicast policies (e.g., received at 1208) for example, that the multicast group G1 is to be received via the MTMA1 108 and the MAG1 1010 (e.g., from a remote source) and that the multicast group G2 is to be received locally (e.g., directly) via the MAG1 1010. As such, the MAG1 1010 may send the MLD report for group G1 from the MN1 1018 to MTMA1 1008 at 1220b and may send the MLD report for group G2 from MN1 1018 to the local multicast router 1038 at 1222. The MTMA1 1008 and the MAG1 1010 may setup a multicast tunnel 1026 to multicast the content to mobile nodes in the visiting network (e.g., via the MAG1 1010 to the MN1 1018). The local multicast router 1038 may multicast the content associated with group G2 via the MAG1 1010. The locally available content, however, may not be tunneled and/or may not traverse the MCN 1020.

In FIG. 12, the MLD report for the multicast group G1 may be sent to the remote/home network via the LMA1 1006 at 1220a and/or the MTMA1 1008 at 1220b based on the received multicast policies. As shown in FIG. 12, the LMA1 1006 and/or the MTMA1 1008, may then act as an anchor point for the multicasting operation.

Figure 13:
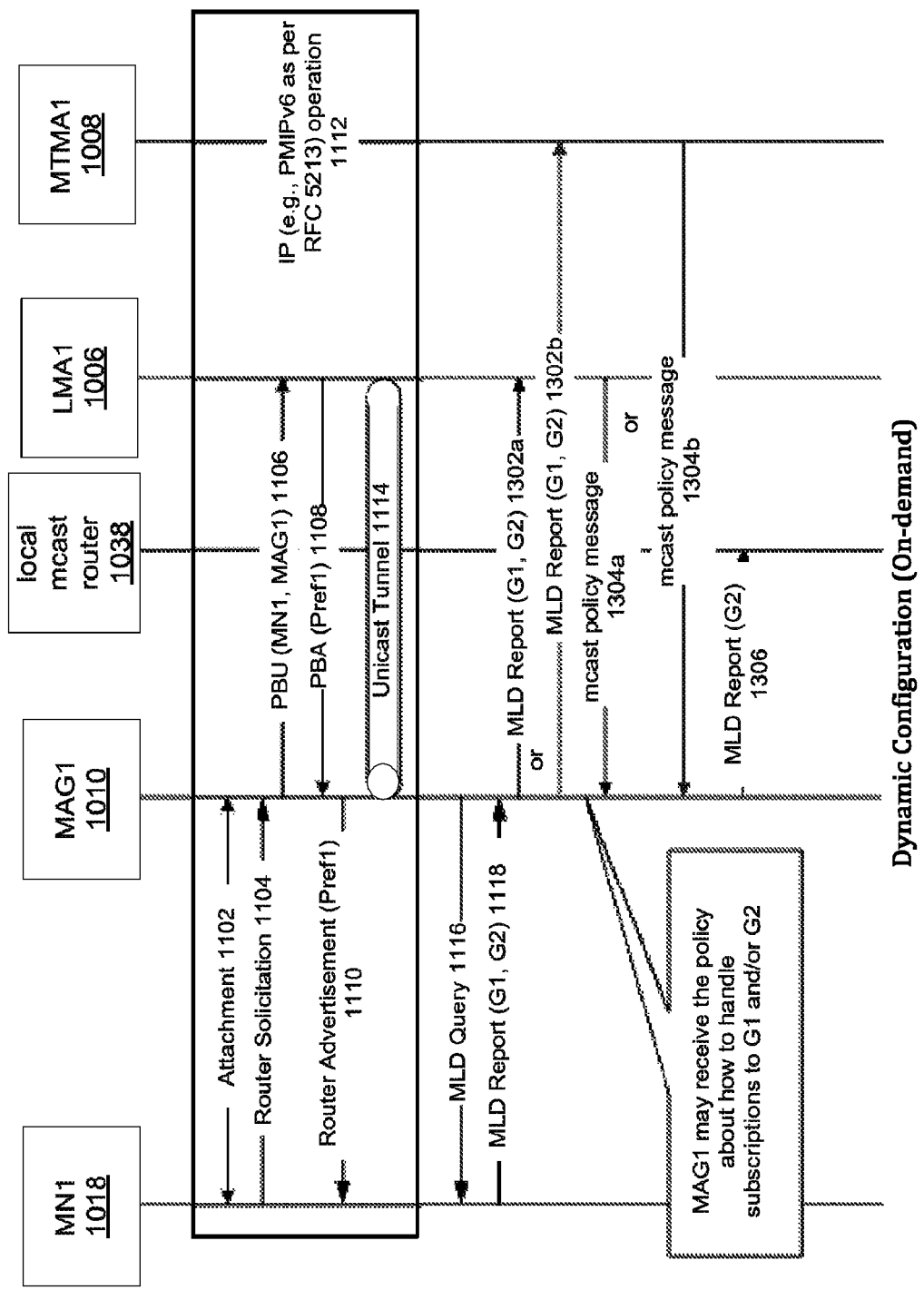
FIG. 13 is a diagram illustrating a further multicast discovery using the multicast architecture of FIG. 10.

FIG. 13 is a diagram illustrating another example implementation of multicast discovery using various policies. As illustrated in FIG. 13, the MAG 1010 may obtain the policies indicating how to handle multicast traffic dynamically and/or on-demand based on a multicast subscription request (e.g., MLD report 1118) from the MN1 1018. For example, the multicast subscription request (e.g., MLD report 1118) may trigger a process for obtaining policies or policy indications.

The signaling for the communications illustrated in FIG. 13 may include out-of-band signaling. For example, the MAG1 1010 may dynamically obtain information via out-of-band signaling (e.g., similarly to the pre-configured procedure illustrated in FIG. 11). Some examples of this signaling may include signaling via the Open Mobile Alliance (OMA) device management (DM)/client provisioning (CP) protocol signaling, the access network discovery and selection function (ANDSF) protocol signaling, the diameter protocol signaling, and/or the radius protocol signaling, among others. Extensions (e.g., PMIPv6/GTP extensions) may be implemented for obtaining/determining policy information dynamically and/or on-demand based on a multicast subscription request (e.g., MLD report 1118). For example, some of the subscriptions to the multicast groups requested by the MN1 1018 may be managed by local subscription (e.g., the LMA1 1006 may convey policy information in a multicast policy message to the MAG1 1010).

A policy message may be used for indicating multicast policies via the MTMA1 1008 and/or the LMA1 1006. Additionally, or alternatively, protocol extensions may be used based on IP (e.g., PMIPv6/GTP) messages and/or mobility/multicast messages. The signaling may take place, for example, after the MAG1 1010 follows its default operation (e.g., that may be influenced by previous mechanisms) of sending the MLD aggregated join to the MTMA1 1008 and/or LMA1 1006.

As shown in FIG. 13, the MAG1 1010 may receive multicast policy messages indicating one or more policies for routing content. The one or more policies indicated by a received multicast policy message may be implemented when the MAG1 1010 does not have a pre-configured (e.g., predetermined) policy for being implemented for a given set of policy considerations. Alternatively, the one or more policies indicated by the received multicast policy message may override a pre-configured (e.g., predetermined) policy. For example, the MAG1 1010 may have received a pre-configured (e.g., predetermined) multicast policy that indicated sending the MLD report of both multicast groups G1 and G2 to the MTMA1 1008 at 1302b. The MTMA1 1008 may receive the MLD report at 1302b and may send a multicast policy message to the MAG1 1010 at 1304b. The multicast policy message may include a current multicast policy indicating to the MAG1 1010 that the MLD report for the multicast group G1 was correctly sent to the MTMA1 1008, but that the MLD report for the multicast group G2 should be sent to the local multicast router 1038 at 1306. The MLD report for the multicast group G2 may be sent to the multicast router 1038 at 1306, for example, such that the content associated with the multicast group G1 may traverse the MCN 1020 via the MTMA1 1008 and MAG1 1010 and the content associated with the multicast group G2 may be sent locally via the MAG1 1010 (e.g., without traversing the MCN 1020).

In FIG. 13, the MLD report may be sent to the remote/home network, via the LMA1 1006 at 1302a and/or the MTMA1 1008 at 1302b, based on the pre-configured or previously received multicast policies for example. The LMA1 1006 and/or the MTMA1 1008 may act as an anchor point for the multicasting operation. The multicast policy message may be sent by the LMA1 1006 at 1304a and/or the MTMA1 1008 at 1304b to indicate to the MAG1 1010 that a multicast group may be sent locally (e.g., via local subscription) or remotely (e.g., via remote subscription).

Figure 14:
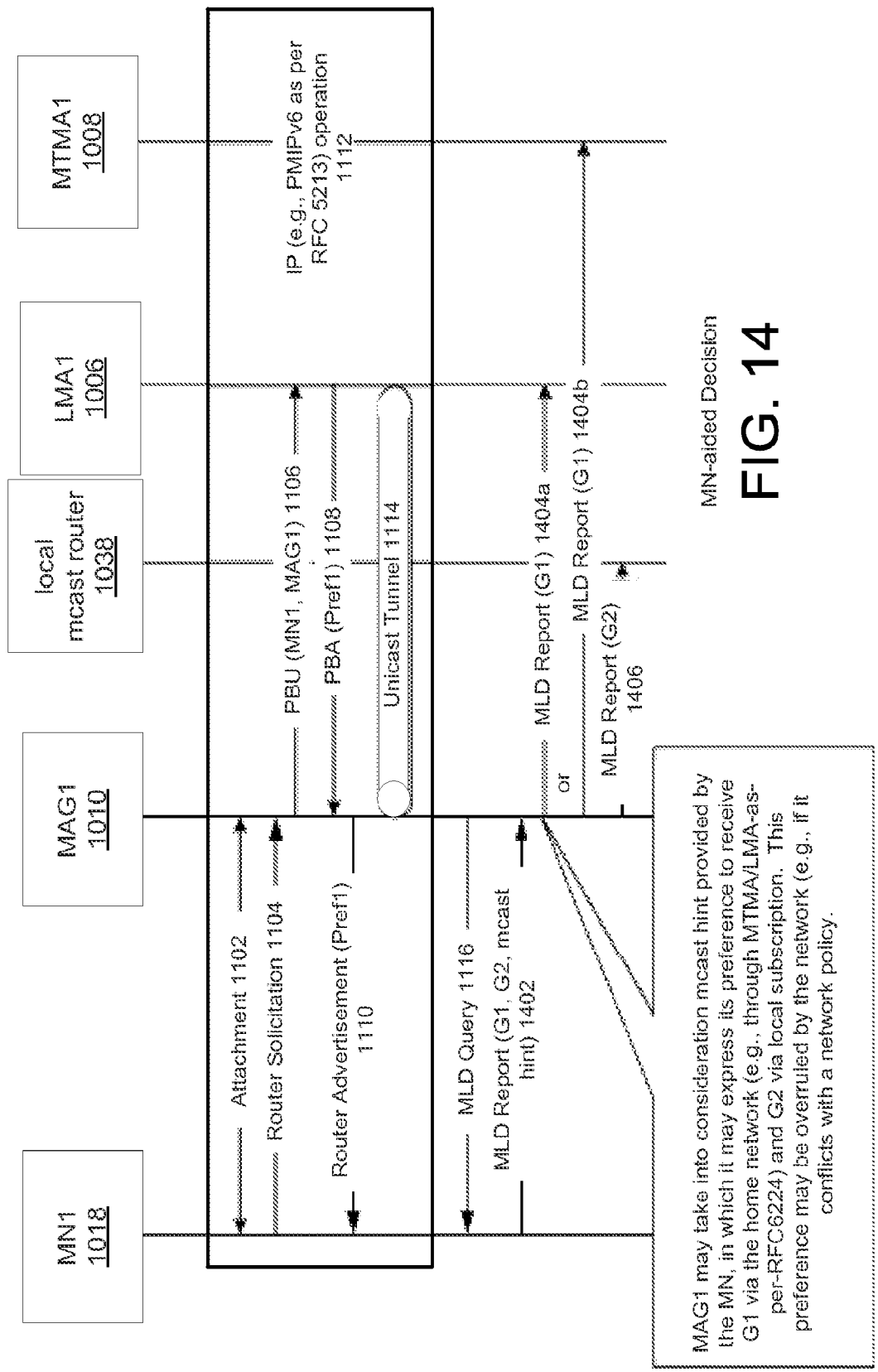
FIG. 14 is a diagram illustrating yet another multicast discovery using the multicast architecture of FIG. 10.

FIG. 14 is a diagram illustrating another example implementation of multicast discovery using various policies. As illustrated in FIG. 14, the MAG 1010 may receive indications of how to handle multicast traffic via the MN1 1018. For example, the MN1 1018 may indicate one or more preferences about how to route its multicast traffic. As shown in FIG. 14, the MN1 1018 may indicate its preference, and the network (e.g., MAG1 1010) may consider the preference in the final decision (e.g., consider the preference in accordance with one or more other established multicast policies). For example, if a conflict exists between a user/MN's preferences and one or more other policies (e.g., an operator's policies), the conflict may be resolved by choosing one of the preferences or the conflicting policy/ies. While it may be described herein that the MN1 1018 may aid in the decision procedure by providing a preference, the MN1 1018 and/or the MAG1 101 may control the decision process when a conflict occurs.

The signaling fir the MN-aided procedure illustrated in FIG. 14 may include out-of-band signaling (e.g., via layer 2 signaling) to send a message from the MN1 1018 to the MAG1 1010. Extended MLD/IGMP signaling (e.g. enhanced MLD reporting) may be implemented in the MN-aided procedure to include information indicating one or more preferences about how the traffic is to get to the MN1 1018 (e.g., either via the remote/home network or locally). The preference may include a flag defining the routing preference or a more detailed field describing the user/MN's preferences. For example, the preference may be indicated in a list of potential networks or domains for content retrieval for which the preference of the MN1 1018 may be local or a list of potential networks or domains for content retrieval for which the preference of the MN1 1018 may be the remote/home network or domain.

Referring to FIG. 14, the MN1 1018 may provide a multicast suggestion, hint, or preference at 1404 for either a local group subscription point or home network subscription point. For example, the multicast suggestion, hint, or preference may be included in the MLD report sent from the MN1 1018 to the MAG1 1010. The multicast policies implemented by the MAG1 1010 may be pre-configured, predetermined, or dynamically determined via signaling as described herein for example. The MAG1 1010 may consider the multicast policies and/or the preference of the MN1 1018 in the selection of the multicast group subscription point. According to another example, the multicast policies themselves may consider the preference of the MN1 1018.

Based on the policies and/or the MN1 1018 preference, the MAG1 1010 may send the MLD report for the multicast group to the determined subscription point. For example, the MLD report for G1 may be sent to the remote/home network, via the LMA1 1006 at 1404a and/or the MTMA1 1008 at 1404b, and the MLD report for the multicast group G2 may be sent to the local multicast router 1038 at 1406, based on the policies and/or the MN1 1018 preference.

Although example embodiments are described herein as implementing certain IP protocols (e.g., PMIPv4 and/or PMIPv6), other mobility protocols (e.g., IP or GTP protocols) may be implemented. Additionally, while example embodiments for routing content are described herein as being implemented via the MAG, the local multicast router or another network entity may also, or alternatively, be used.

In certain representative embodiments, selection of an MTMA procedure may be used to enable the MTMA1 1008 as a topological anchor point for multicast traffic, while the MAG1 1010 may remain as an IGMP/MLD proxy. This selection may reduce multicast traffic replication and/or support different IP (e.g., PMIPv6) implementation scenarios. It may also allow accessing multicast content from the remote/home network, even when the mobile node is in a roaming scenario for example, and/or may enable operators to control the content delivered to subscribers. Such an implementation may also allow users to preserve access to their home content while roaming on a visited network (e.g., visited domain 1034).

In certain representative embodiments, selection of a direct multicast routing may enable local routing that may make the direct connection between the MAG 1010 and the local multicast router 1038 (e.g., such that the LMA1 1006 may not be involved in the multicast content distribution). The direct multicast (or the local routing) may allow the MN1 1018 to access multicast content locally available at the visited domain 1034, and/or when a local breakout for specific multicast traffic at 1034 may be used. The direct multicast routing may avoid traversing the MCN 1020 and may provide for efficient offloading.

According to an example embodiment, by selecting between the MTMA procedure (also referred to as a Dedicated LMA procedure) or the local subscription/routing procedure, tunnel convergence may be mitigated by separating anchors for unicast and multicast traffic. The embodiments described herein may allow a user to access multicast content from the home network and/or may provide an operator with more control over the MN.

By integrating local and/or remote access of multicast content, together with the standardized procedure via the LMA unicast for example, multicast traffic may be selectively routed to the home, visited, and/or local domains. As further described herein, the selection of traffic may be based on various policies, such as operator policies (e.g., 3GPP SIPTO, LIPA, etc.), MN policies, user policies, traffic type or flow policies, and/or the like, for example.

Although features and elements are described herein in particular combinations, each feature or element can be used alone or in any combination with the other features and elements, in addition, the methods described herein may be implemented in a computer program, software, or firmware incorporated in a computer-readable medium for execution by a computer or processor. Examples of computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a MN, WTRU, UE, terminal, base station, RNC, or any host computer.

Moreover, in the embodiments described herein processing platforms, computing systems, controllers, and other devices containing processors may be implemented. These devices may contain at least one Central Processing Unit ("CPU"), memory, and/or a transceiver for transmitting and/or receiving instructions. Operations or instructions may be performed by the various CPUs and memories. The memory locations where data bits are maintained may be physical locations that have particular electrical, magnetic, optical, or organic properties corresponding to or representative of the data bits. The data bits may also be maintained on a computer readable medium including magnetic disks, optical disks, and any other volatile (e.g., Random Access Memory ("RAM")) or non-volatile (e.g., Read-Only Memory ("ROM")) storage system readable by the CPU. The computer readable medium may include cooperating or interconnected computer readable medium, which may exist on the processing system and/or may be distributed among multiple interconnected processing systems that may be local or remote to the processing system. The embodiments described herein are not limited to use of the above-mentioned memories or platforms and other platforms and memories may support the described embodiments.

Suitable processors may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in an MN, a WTRU, a UE, a terminal, a base station, Mobility Management Entity (MME) or Evolved Packet Core (EPC), or any host computer. The MN or WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NEC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although specific embodiments are described herein, these embodiments are not intended to be limiting. For example, while the embodiments herein may be described in terms of communication systems, the systems, methods, or apparatuses described herein may be implemented in software on microprocessors/general purpose computers (not shown), in certain embodiments, one or more of the functions of the various components may be implemented in software that controls a general-purpose computer.

What is claimed:

1. A method for managing multicast traffic using a Mobile Access Gateway (MAG), the method comprising:
    receiving, at the MAG, an indication of at least one multicast policy, wherein the indication of the multicast policy is received from a Local Mobility Anchor (LMA) or a Multicast Tree Mobility Anchor (MTMA);
    receiving, at the MAG, information from a mobile node that indicates at least one multicast group that is associated with the mobile node; and
    selecting, at the MAG, a multicast subscription associated with each of the at least one multicast group for routing multicast traffic to the mobile node, wherein the multicast subscription is selected based on the received indication of the at least one multicast policy, and wherein the multicast subscription comprises at least one of a Multicast Tree Mobility Anchor (MTMA) subscription or a direct routing subscription.

2. The method of claim 1, wherein the information is received via a multicast listener discovery (MLD) report.

3. The method of claim 1, wherein the at least one multicast policy comprises at least one user policy.

4. The method of claim 1, wherein the at least one multicast policy is a dynamic policy.

5. The method of claim 4, wherein the selection of the multicast subscription is determined dynamically based on the indicated at least one multicast policy.

6. The method of claim 5, wherein the indication of the at least one multicast policy is received via a proxy binding acknowledgement (PBA) message.

7. The method of claim 6, wherein the PBA message comprises at least one extension field associated with the at least one multicast policy.

8. The method of claim 7, wherein the at least one multicast policy comprises one or more of a mobile node policy, a user policy, an operator policy, or a traffic policy.

9. The method of claim 1, wherein the multicast traffic comprises multicast traffic of a first type and multicast traffic of a second type, and wherein the at least one multicast policy indicates that one or more of the multicast traffic of the first type should be routed via a home domain associated with the mobile node, or the multicast traffic of the second type should be routed via a local domain associated with the mobile node.

10. A Mobile Access Gateway (MAG) for managing multicast traffic, the MAG comprising:
    a processor; and
    a memory having stored therein executable instructions for execution by the processor to:
        receive, via a transceiver an indication of at least one multicast policy, wherein the indication of the multicast policy is received from a Local Mobility Anchor (LMA) or a Multicast Tree Mobility Anchor (MTMA),
        receive, via the transceiver, information from a mobile node that indicates at least one multicast group that is associated with the mobile node, and
        select a multicast subscription associated with the each of at least one multicast group for routing multicast traffic to the mobile node, wherein the multicast subscription is selected based on the received indication of the at least one multicast policy, and wherein the multicast subscription comprises at least one of a Multicast Tree Mobility Anchor (MTMA) subscription or a direct routing subscription.

11. The MAG of claim 10, wherein the information is received via a multicast listener discovery (MLD) report.

12. The MAG of claim 10, wherein the at least one multicast policy comprises at least one user policy.

13. The MAG of claim 10, wherein the at least one multicast policy is a dynamic policy.

14. The MAG of claim 13, wherein the selection of the multicast subscription is determined dynamically based on the indicated at least one multicast policy.

15. The MAG of claim 14, wherein the indication of the at least one multicast policy is received via a proxy binding acknowledgement (PBA) message.

16. The MAG of claim 15, wherein the PBA message comprises at least one extension field associated with the at least one multicast policy.

17. The MAG of claim 16, wherein the at least one multicast policy comprises one or more of a mobile node policy, a user policy, an operator policy, or a traffic policy.

18. The MAG of claim 10, wherein the multicast traffic comprises multicast traffic of a first type and multicast traffic of a second type, and wherein the at least one multicast policy indicates that one or more of the multicast traffic of the first type should be routed via a home domain associated with the mobile node and that the multicast traffic of the second type should be routed via a local domain associated with the mobile node.

19. The MAG of claim 10, wherein the at least one multicast group comprises a plurality of multicast groups, and further comprising selecting a respective multicast subscription for each multicast group for routing the multicast traffic to the mobile node.

\* \* \* \* \*